US012509543B2

United States Patent
Krasovskiy et al.

(10) Patent No.: US 12,509,543 B2
(45) Date of Patent: Dec. 30, 2025

(54) SUBSTITUTED SILANES AS CHAIN TRANSFER AGENTS FOR POLYOLEFIN PRODUCTION

(71) Applicant: Dow Global Technologies LLC, Midland, MI (US)

(72) Inventors: Arkady L. Krasovskiy, Lake Jackson, TX (US); Ivan A. Konstantinov, Lake Jackson, TX (US); Hayley A. Brown, Lake Jackson, TX (US); Mehmet Demirors, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 677 days.

(21) Appl. No.: 17/907,709

(22) PCT Filed: Mar. 29, 2021

(86) PCT No.: PCT/US2021/024602
§ 371 (c)(1),
(2) Date: Sep. 29, 2022

(87) PCT Pub. No.: WO2021/202349
PCT Pub. Date: Oct. 7, 2021

(65) Prior Publication Data
US 2023/0136233 A1  May 4, 2023

Related U.S. Application Data

(60) Provisional application No. 63/002,636, filed on Mar. 31, 2020.

(51) Int. Cl.
C08F 2/38 (2006.01)
C08F 4/34 (2006.01)
(Continued)

(52) U.S. Cl.
CPC ............ *C08F 293/005* (2013.01); *C08F 2/38* (2013.01); *C08F 4/34* (2013.01); *C08F 10/02* (2013.01); *C08F 2438/00* (2013.01)

(58) Field of Classification Search
None
See application file for complete search history.

(56) References Cited

U.S. PATENT DOCUMENTS 3,377,330 A    4/1968  Mortimer et al.
4,599,392 A    7/1986  McKinney et al.
(Continued)

FOREIGN PATENT DOCUMENTS

JP    2003501296 A    1/2003
WO   2010042390 A1   4/2010
(Continued)

OTHER PUBLICATIONS

Brazil Office Action dated Oct. 14, 2024, pertaining to BR Patent Application No. 112022017522-1, 8 pgs.
(Continued)

*Primary Examiner* — Richard A. Huhn
(74) *Attorney, Agent, or Firm* — Dinsmore & Shohl LLP

(57) ABSTRACT

Embodiments are directed to a method of making an olefin-based polymer by free-radical polymerization in a reactor system. The method includes initiating a free-radical polymerization of an olefin-based monomer, propagating growth of the olefin-based polymer during continued free-radical polymerization of the olefin-based monomer, and adding to the reactor system a chain transfer agent that terminates the growth of the olefin-based polymer. The chain transfer agent includes a silane. Examples of suitable silanes are: triethylsilane, diethylmethylsilane, tris(trimethylsilyl)silane, n-butylsilane, dimethylphenylsilane, phenylsilane, chlorodimethylsilane, diisopropylaminosilane, 1,2-bis(dimethylsilyl)
(Continued)

benzene, 1,3-bis(dimethylsilyl) benzene, 1,4-bis(dimethylsilyl)benzene, 1,1, 3,3-tetramethyldisiloxane, trimethylsilane, (trimethylsilyl)dimethylsilane, and bis(trimethylsilyl)methylsilane.

12 Claims, 3 Drawing Sheets

(51) Int. Cl.
  *C08F 10/02* (2006.01)
  *C08F 293/00* (2006.01)

(56) References Cited

U.S. PATENT DOCUMENTS

| | | |
|---|---|---|
| 8,859,704 B2 | 10/2014 | Karjala et al. |
| 2010/0087606 A1 | 4/2010 | Karjala et al. |
| 2011/0196105 A1 | 8/2011 | Eddy et al. |

FOREIGN PATENT DOCUMENTS

| | | |
|---|---|---|
| WO | 2013059042 A1 | 4/2013 |
| WO | 2013078018 A2 | 5/2013 |

OTHER PUBLICATIONS

Williams et al. "The construction of a polyethylene calibration curve for gel permeation chromatography using polystyrene fractions", J Polym. Sci., Polym. Let., 6,621 (1968).

Zimm "Apparatus and Methods for Measurement and Interpretation of the Angular Variation of Light Scattering; Preliminary Results on Polystyrene Solutions", J. Chem. Phys., 16, 1099 (1948).

Kratochvil "Fundamental Light-Scattering Methods", Elsevier, Oxford, N. Y. pp. 113-144 (1987).

Yau "Examples of Using 3D-GPC-TREF for Polyolefin Characterization", Macromol. Symp., 2007, 257, 29-45.

Mayo "Chain Transfer in the Polymerization of Styrene: The Reaction of Solvents with Free Radicals", J Am. Chem. Soc. 1943, 65, 2324-2329.

Mortimer "Chain Transfer in Ethylene Polymerization", J Polym. Sci. A-1, 8, 881-900 (1966).

Mortimer "Chain Transfer in Ethylene Polymerization. VI. The Effect of Pressure", J. Polymer Science: Part A-1, 8, 1543-1548 (1970).

Mortimer "Chain Transfer in Ethylene Polymerization. V. The Effect of Temperature", J. Polymer Science: Part A-1, 8, 1535-1542 (1970).

Mortimer "Chain Transfer in Ethylene Polymerization. II.", J. Polymer Science: 4, 1895-1897 (1966).

Ehrlich et al. "Fundamentals of the Free-Radical Polymerization of Ethylene", Advanced Polymers, vol. 7, 386-448 (1970).

Kanabus-Kaminska et al. "Reduction of Silicon-Hydrogen Bond Strengths" J . Am. Chem. Soc. 1987, 109, 5267-5268.

Bordwell et al. "Homolytic Bond Dissociation Energies in Solution from Equilibrium Acidity and Electrochemcial Data", J. Am. Chem. Soc. 1988, 110, 1229-1231.

Zhao et al. "Quantum chemical study of C—SH bond dissociation energies for some thiol compounds", Journal of Molecular Structure: Theochem 909 (2009) 9-12.

Balke et al. "A Strategy for Interpreting Multidetector Size-Exclusion Chromatography Data II", Application in Plastic Waste Recovery, 1992, 11 pgs.

Chinese Office Action dated Jan. 17, 2024, pertaining to CN Patent Application No. 2021800190235, 18 pgs.

International Search Report and Written Opinion dated Aug. 27, 2021, pertaining to Int'l Patent Application No. PCT/US2021/024602, 15 pgs.

Stadler et al. "Catalytic Chain Transfer Polymerization to Functional Reactive End Groups for Controlled Free Radical Growth", Macromolecules 2020, 53, 2362-2368.

Terent'ev et al. "Radical Telomerization of Ethylene by Triethylsilane Initiated by Mn2(CO)10 or Butyl Peroxide", Plenum Publishing Corporation 1985, 2 pgs.

Amin et al. "Versatile Pathways for In Situ Polyolefin Functionalization with Heteroatoms: Catlaytic Chain Transfer", Angew. Chem. Int. Ed. 2008, 47, 2006-2025.

Hyatt et al. "Silane as Chain Transfer Agent for the Polymerization of Ethylene Catalyzed by a Palladium(II) Diimine Catalyst", ACS Catal. 2017, 7, 5717-5720.

Smirnova et al. "Features of the Chain-Transfer Reaction of Group IV B Organo-Metal Compounds", Polymer Science U.S.S.R. vol. 24. No. 5, pp. 1127-1138, 1982.

Hyatt et al. "Introduction of Highly Tunable End-Groups in Polyethylene via Chain-Transfer Polymerization using a Cobalt(III) Catalyst", Organometallics 2019, 38, 788-796.

Japanese Office Action dated Mar. 4, 2025, pertaining to JP Patent Application No. 2022-552851, 7 pgs.

Radical Telomerization of Ethylene by Trietylsilane Intiated by Mn2( CO)10 or Butyl Peroxide, Russian Chemical Bulletin, vol. 33, 1984, 2589-2590.

Yukio Takagi, Telomerization, Journal of the Society of Synthetic Organic Chemistry, vol. 19, 1961, 172-187, Online ISSN:1883-6526.

Communication pursuant to Article 94(3) EPC dated Aug. 8, 2025, pertaining to EP Patent Application No. 21718466.2, 4 pgs.

Korean Office Action dated Oct. 21, 2025, pertaining to KR Patent Application No. 10-2022-7037122, 11 pgs.

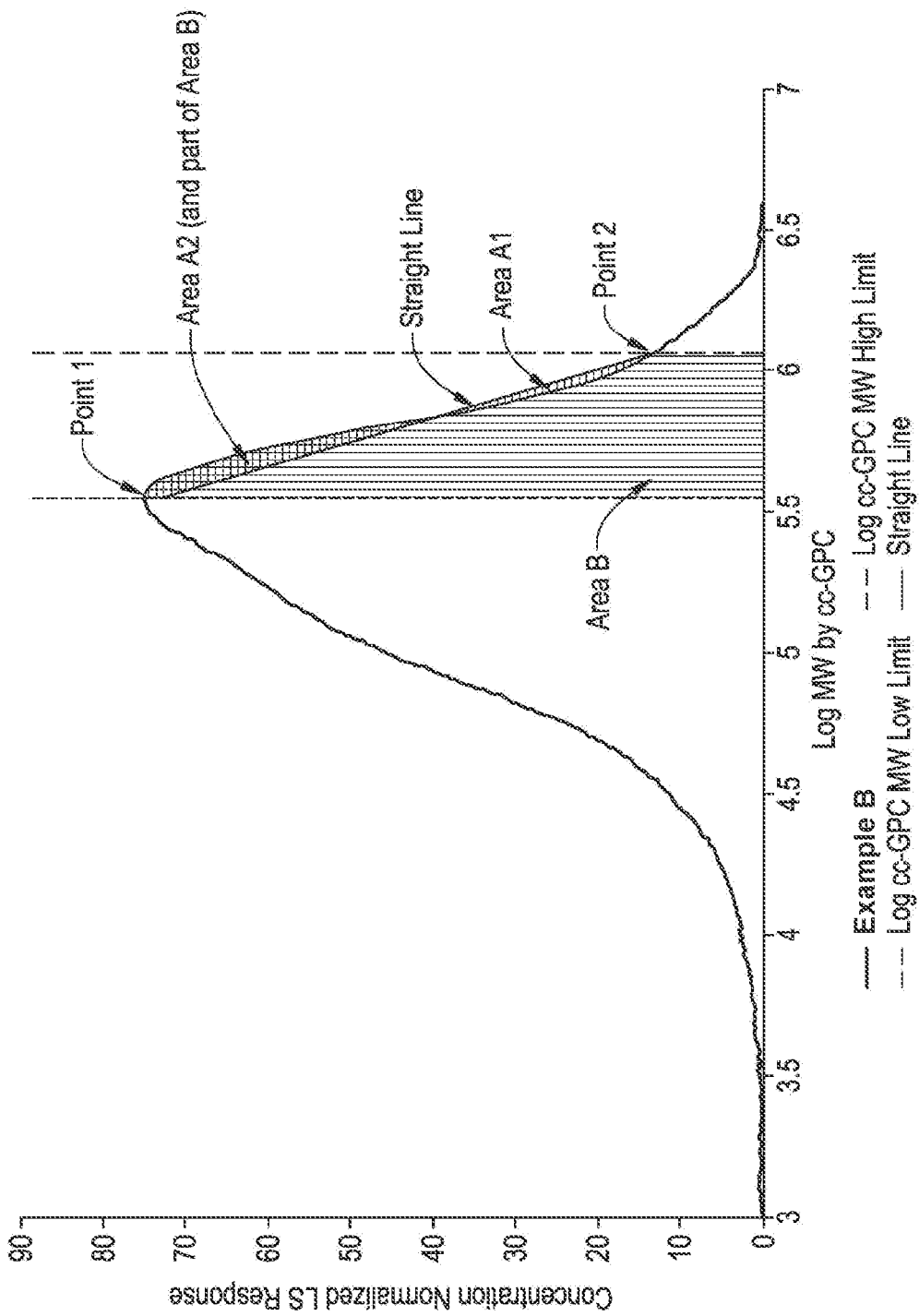

SUBSTITUTED SILANES AS CHAIN TRANSFER AGENTS FOR POLYOLEFIN PRODUCTION

CROSS REFERENCES TO RELATED APPLICATIONS

This application is a national-stage application under 35 U.S.C. § 371 of International Application No. PCT/US2021/024602, filed Mar. 29, 2021, which International Application claims benefit of priority to U.S. Provisional Patent Application No. 63/002,636, filed on Mar. 31, 2020, the entire disclosure of which is hereby incorporated by reference.

TECHNICAL FIELD

Embodiments of the present disclosure generally relate to olefin polymerization chain transfer agents and processes and, more specifically, to methods of making an olefin-based polymer by free radical polymerization using substituted silanes as chain transfer agents.

BACKGROUND

Chain transfer agents (CTAs), or "telogens," are often used to control the melt index in a free-radical polymerization process. "Chain transfer" involves the termination of growing polymer chains, thus limiting the ultimate molecular weight of the polymer material. Chain transfer agents are typically hydrogen atom donors that react with a growing polymer chain and stop the polymerization reaction of the chain. Known CTAs include many types of hydrogen atom donor compounds, such as saturated or unsaturated hydrocarbons, aldehydes, ketones, and alcohols. By manipulating the concentration and type of chain transfer agent used in a process, one can affect the average length and molecular weight distribution of the polymer chains. This in turn affects the melt index ($I_2$ or MI), which is related to molecular weight.

After hydrogen atom donation, a CTA may form a radical that can start a new polymer chain. The result is that the original CTA is incorporated into a new or existing polymer chain, thereby introducing a new functionality into the polymer chain associated with the original CTA. The CTA may introduce new functionality into the polymer chain that is not normally the result of the monomer/comonomer polymerization.

Low density olefin-based polymers produced in the presence of CTAs are modified in a number of physical properties, such as processability; film optical properties such as haze, gloss and clarity; density; stiffness; yield point; film draw; and tear strength. For example, an α-olefin acting as a CTA could also introduce a short chain branch into a polymer chain upon incorporation.

Known CTAs belong to one of two categories: low-activity CTAs and high-activity CTAs. Low-activity CTAs typically have a chain transfer constant (Cs) that is less than one and are typically saturated or unsaturated hydrocarbons, aldehydes, or ketones. High-activity CTAs typically have Cs greater than or equal to one and contain sulfur or phosphorus. Although the high-activity CTAs tend to be more efficient in olefin polymerizations, they also cause sulfur or phosphorus to be included in the resulting polymers. When such polymers are included in food applications, for example, decomposition of the polymers over time may produce offensive odors and tastes. Therefore, a need exists for high-activty CTAs and methods of making low density olefin-based polymers by free-radical polymerization that do not incorporate sulfur and phosphorus into the resulting polymers.

SUMMARY

According to some embodiments, a method of making an olefin-based polymer by free-radical polymerization in a reactor system includes initiating a free-radical polymerization of an olefin-based monomer, propagating growth of the olefin-based polymer during continued free-radical polymerization of the olefin-based monomer, and adding to the reactor system a chain transfer agent that terminates the growth of the olefin-based polymer. The chain transfer agent includes a silane of formula (1):

(1)

where $R^1$, $R^2$, $R^3$, and $R^4$ are independently selected from a hydrogen atom, a (C1-C40)hydrocarbyl, $-N(R^5)_2$, $-Si(R^5)_3$, $-OSi(R^5)_3$, $-OR^5$, and $-R^6-Si(R^5)_3$; each $R^5$ is independently selected from a hydrogen atom and a (C1-C40) hydrocarbyl; each $R^6$ is (C1-C40)hydrocarbylene; and optionally, any two of $R^1$, $R^2$, $R^3$, and $R^4$, or any two $R^5$ bonded to the same nitrogen atom, or any two $R^5$ bonded to the same silicon atom, are connected to form a ring having from 3 to 50 atoms in the ring, excluding any hydrogen atoms.

BRIEF DESCRIPTION OF THE DRAWINGS

The Summary as well as the Detailed Description will be better understood when read in conjunction with the appended drawings. It should be understood, however, that the scope of the claimed inventions are not limited to the precise arrangements and instrumentalities shown. The components in the drawings are not necessarily to scale. In the drawings, like reference numerals designate corresponding parts throughout the several views.

FIG. 3 is a concentration-normalized light scattering (LS) chromatograph curve for a range of log conventionally calibrated GPC molecular weight and parts of the GPC-LS Characterization analysis for an exemplary system described herein.

DETAILED DESCRIPTION

Figure 1:
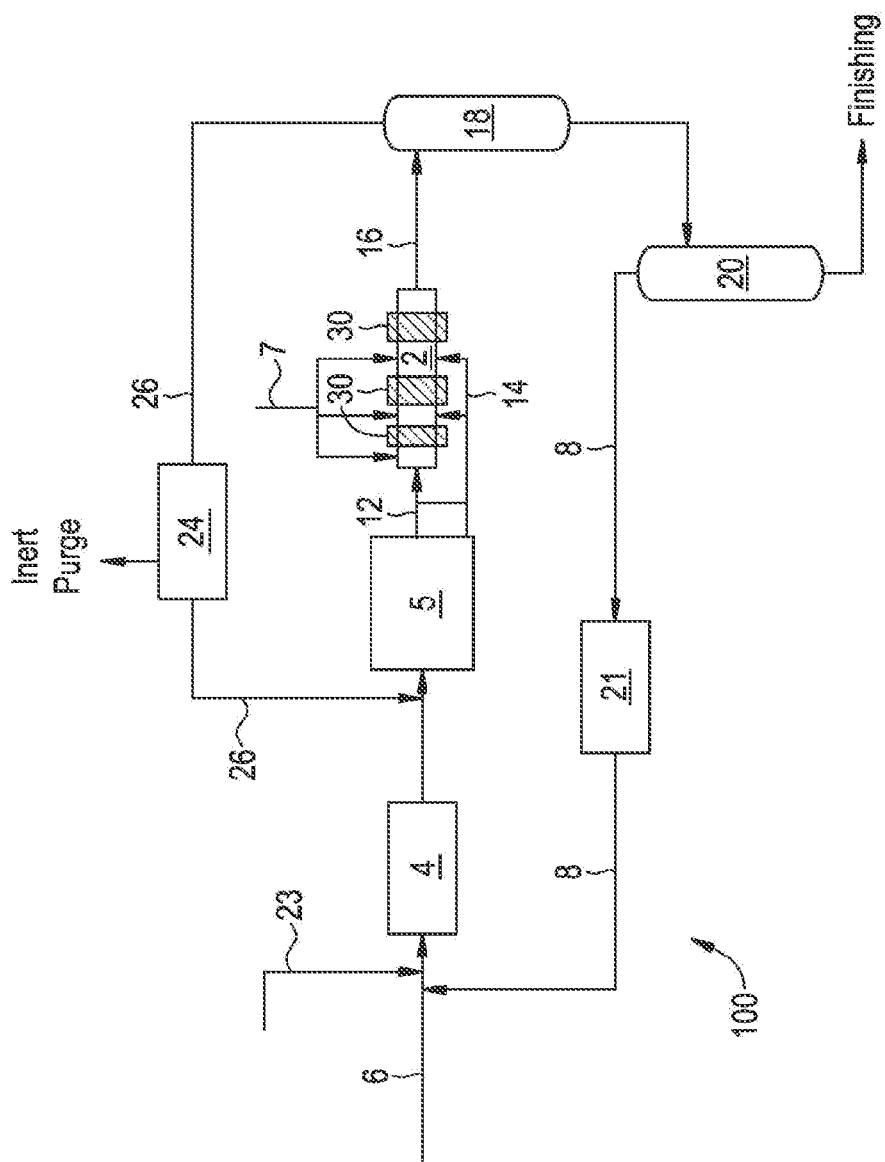
FIG. 1 is a diagram of a process describing the elements of a disclosed tube reactor system 100.

According to some embodiments, the CTA may be used to make a low density olefin-based polymer, for example, a low density ethylene-based polymer, having a narrow molecular weight distribution, which can be used for blown and cast films and used alone or in blends with other polymers.

A high-activity CTA may have a sufficiently high degree of activity during free-radical polymerization that the growing monomer chain favors acceptance of the hydrogen atom donated by the CTA over propagation with another monomer molecule. A CTA is considered a high-activity CTA when the chain transfer constant (Cs) is greater than one. The high-activity CTA in the process fluid is consumed in a manner by which the relative concentration of the CTA diminishes with respect to the concentration of monomer as the reaction proceeds. If the reaction continues and no additional CTA is provided, the high-activity CTA may be depleted, potentially such that the amount of CTA in the reaction system is insufficient to control molecular weight near the end of the reaction.

By using a high-activity CTA at the beginning of the process, the formation of the high-molecular weight polymer chains is suppressed at the beginning of the process and the resulting polymers have a narrower molecular weight distribution. The suppression prevents the formation of highly branched, high molecular-weight polymer chains that form in the later stages of the process. Further, the suppression improves the overall single-pass process conversion by improving process system performance.

However, effectively using a high-activity CTA by itself in a free-radical polymerization process is challenging. To compensate, additional high-activity CTAs may be added later in the process. Alternatively, a combination of at least one high-activity CTA and at least one low-activity CTA may be incorporated at the beginning of the process. In such a process, as the reaction proceeds from beginning to end, the high-activity CTA is preferentially consumed during the period when the monomer is in relatively high concentration, especially in tubular reactor systems with more than one reaction zone (i.e., initiator injection points). The low-activity CTA is not preferentially consumed early in the process, because both its concentration relative to the monomer and its reaction rate with the monomer are lower than those of the high-activity CTA. Later in the process the low-activity CTA has a greater influence over the process by supporting chain transfer to control molecular weight, because both the monomer and the high-activity CTA have been substantially consumed, while the low-activity CTA has not significantly reacted with the forming polymer chains.

Methods of making an olefin-based polymer by free-radical polymerization in a reactor system, according to embodiments, may include initiating a free-radical polymerization of an olefin-based monomer, propagating growth of the olefin-based polymer during continued free-radical polymerization of the olefin-based monomer, and adding to the reactor system a chain transfer agent that terminates the growth of the olefin-based polymer. The chain transfer agent includes a silane. In embodiments, the free-radical polymerization may be a high pressure peroxide-initiated free-radical polymerization.

In embodiments of the methods of making the olefin-based polymer, the CTA may include a silane of formula (1):

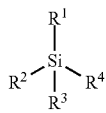

(1)

where $R^1$, $R^2$, $R^3$, and $R^4$ are independently selected from a hydrogen atom, a (C1-C40)hydrocarbyl, —N($R^5$)$_2$, —Si($R^5$)$_3$, —OSi($R^5$)$_3$, —O$R^5$, and —$R^6$—Si($R^5$)$_3$. Each $R^5$ is independently selected from a hydrogen atom and a (C1-C40) hydrocarbyl. Each $R^6$ is (C1-C40)hydrocarbylene. Optionally, any two of $R^1$, $R^2$, $R^3$, and $R^4$, or any two $R^5$ bonded to the same nitrogen atom, or any two $R^5$ bonded to the same silicon atom, are connected to form a ring having from 3 to 50 atoms in the ring, excluding any hydrogen atoms. In embodiments, the silane of formula (1) is not triethylsilane or diethylmethylsilane.

When used to describe certain carbon atom-containing chemical groups, a parenthetical expression having the form "(Cx-Cy)" means that the unsubstituted form of the chemical group has from x carbon atoms to y carbon atoms, inclusive of x and y. For example, a (C1-C50)alkyl is an alkyl group having from 1 to 50 carbon atoms in its unsubstituted form. In some embodiments and general structures, certain chemical groups may be substituted by one or more substituents such as $R^S$. An $R^S$ substituted chemical group defined using the "(Cx-Cy)" parenthetical may contain more than y carbon atoms depending on the identity of any groups $R^S$. For example, a "(C1-C50)alkyl substituted with exactly one group $R^S$, where $R^S$ is phenyl (—C$_6$H$_5$)" may contain from 7 to 56 carbon atoms. Thus, in general when a chemical group defined using the "(Cx-Cy)" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "(C1-C40)hydrocarbyl" means a hydrocarbon radical of from 1 to 40 carbon atoms and the term "(C1-C40)hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a (C1-C40)hydrocarbyl may be an unsubstituted or substituted (C1-C40)alkyl, (C3-C40)cycloalkyl, (C3-C20)cycloalkyl-(C1-C20)alkylene, (C6-C40) aryl, or (C6-C20)aryl-(C1-C20)alkylene (such as benzyl (—CH$_2$—C$_6$H$_5$)).

The terms "(C1-C40)alkyl" means a saturated straight or branched hydrocarbon radical of from 1 to 40 carbon atoms that is unsubstituted or substituted by one or more $R^S$. Examples of unsubstituted (C1-C40)alkyl are unsubstituted (C1-C20)alkyl; unsubstituted (C1-C10)alkyl; unsubstituted (C1-C5)alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted (C1-C40)alkyl are substituted (C1-C20)alkyl, substituted (C1-C10)alkyl, trifluoromethyl, and [C45]alkyl. The term "[C45]alkyl" means there is a maximum of 45 carbon atoms in the radical, including substituents, and is, for example, a (C27-C40)alkyl substituted by one $R^S$, which is a (C1-C5)alkyl, respectively. Each (C1-C5)alkyl may be methyl, trifluoromethyl, ethyl, 1-propyl, 1-methylethyl, or 1,1-dimethylethyl.

The term "(C6-C40)aryl" means an unsubstituted or substituted (by one or more $R^S$) monocyclic, bicyclic, or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted (C6-C40)aryl include: unsubstituted (C6-C20)aryl, unsubstituted (C6-C18)aryl; 2-(C1-C5)alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted (C6-C40)aryl include: substituted (C1-C20)aryl; substituted (C6-C18)aryl; 2,4-bis([C20]alkyl)-phenyl; polyfluorophenyl; pentafluorophenyl; and fluoren-9-one-1-yl. The term "[C20]alkyl" means there is a maximum of 20 carbon atoms in the radical, including substituents, and is, for example, a (C2-C15)alkyl substituted by one $R^S$, which is a (C1-C5)alkyl, respectively.

The term "(C3-C40)cycloalkyl" means a saturated cyclic hydrocarbon radical of from 3 to 40 carbon atoms that is unsubstituted or substituted by one or more $R^S$. Other cycloalkyl groups (e.g., (Cx-Cy)cycloalkyl) are defined in an analogous manner as having from x to y carbon atoms and being either unsubstituted or substituted with one or more $R^S$. Examples of unsubstituted (C3-C40)cycloalkyl are unsubstituted (C3-C20)cycloalkyl, unsubstituted (C3-C10) cycloalkyl, cyclopropyl, cyclobutyl, cyclopentyl, cyclohexyl, cycloheptyl, cyclooctyl, cyclononyl, and cyclodecyl. Examples of substituted (C3-C40)cycloalkyl are substituted (C3-C20)cycloalkyl, substituted (C3-C10)cycloalkyl, cyclopentanon-2-yl, and 1-fluorocyclohexyl.

Examples of (C1-C40)hydrocarbylene include unsubstituted or substituted (C6-C40)arylene, (C3-C40)cycloalkylene, and (C1-C40)alkylene (e.g., (C1-C20)alkylene). The diradicals may be on the same carbon atom (e.g., —CH$_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradical, and others a 1,2-diradical. The α,ω-diradical is a diradical that has maximum carbon backbone spacing between the radical carbons. Some examples of (C2-C20)alkylene α,ω-diradicals include ethan-1,2-diyl (i.e. —CH$_2$CH$_2$—), propan-1,3-diyl (i.e. —CH$_2$CH$_2$CH$_2$—), 2-methylpropan-1,3-diyl (i.e. —CH$_2$CH(CH$_3$)CH$_2$—). Some examples of (C6-C40)arylene α,ω-diradicals include phenyl-1,4-diyl, napthalen-2,6-diyl, or napthalen-3,7-diyl.

In embodiments, the CTA does not comprise sulfur or phosphorus.

In embodiments, the CTA comprises a silane of formula (1) selected from triethylsilane, diethylmethylsilane, tris(trimethylsilyl)silane, n-butylsilane, dimethylphenylsilane, phenylsilane, chlorodimethylsilane, diisopropylaminosilane, 1,2-bis(dimethylsilyl)benzene, 1,3-bis(dimethylsilyl) benzene, 1,4-bis(dimethylsilyl)benzene, and bis(dimethylsilyl) ether. In embodiments, the CTA comprises a silane of formula (1) selected from trimethylsilane, (trimethylsilyl) dimethylsilane, bis(trimethylsilyl)methylsilane, and tris(t-rimethylsilyl)silane. In embodiments, the CTA comprises tris(trimethylsilyl)silane.

In the methods herein of making an olefin-based polymer, when the CTA is a high-activity CTA including a silane of formula (1), a low-density olefin-based polymer may be obtained that has a density from about 0.90 g/cm$^3$ to about 0.94 g/cm$^3$, a molecular weight distribution, $M_w/M_n$, from about 2 to about 30, and a melt index, I2, from about 0.1 grams per 10 minutes to about 50 grams per 10 minutes. In some embodiments, the olefin-based polymer may comprise an ethylene-based polymer. In some embodiments, the olefin-based polymer may consist essentially of an ethylene-based polymer. In some embodiments, the olefin-based polymer may consist of an ethylene-based polymer.

The low density olefin-based polymer may be a homopolymer of the olefin, for example ethylene, or it may be an olefin-based interpolymer comprised of the olefin and at least one comonomer. Comonomers useful for incorporation into an olefin-based interpolymer, for example in addition to ethylene in an ethylene/α-olefin interpolymer, include, but are not limited to, propylene, isobutylene, 1-butene, 1-pentene, 1-hexene, 3-methyl-1-pentene, 4-methyl-1-pentene, and 1-octene, non-conjugated dienes, polyenes, butadienes, isoprenes, pentadienes, hexadienes (for example, 1,4-hexadiene), octadienes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Ethylene is frequently copolymerized with at least one $C_3$-$C_{20}$α-olefin, such as propene, 1-butene, 1-hexene, and 1-octene.

The low-density olefin-based polymer further comprising silicon can exhibit a numerical relationship between conventionally calibrated molecular weight, $M_{W,GPC}$, and an absolute molecular weight, $M_{w,Abs}$, both in grams per mole as determined by the Triple Detector Gel Permeation Chromatography method, described infra, and a zero shear viscosity, $\eta_0$, in Pascal-seconds at 190° C., as determined by the Zero Shear Viscosity method, described infra. Further, the low-density olefin-based polymer further comprising silicon can exhibit a conventionally calibrated molecular weight, an absolute molecular weight, and a zero shear viscosity relationship that exhibits long chain branching as characterized by a gpcBR value greater than 0.05 as determined by a gpcBR Branching Index by the 3D-GPC method.

Disclosed is a low density olefin-based polymer further comprising silicon that exhibits a relationship between the concentration-normalized light scattering (LS) response value and the logarithm value of conventionally calibrated molecular weight, $M_{W,GPC}$, that is different from that of other low density olefin-based polymers. The difference is captured in a relationship called a GPC-LS Characterization value (Y). The GPC-LS Characterization value (Y) is determined by the GPC-LS Characterization method, described infra. Disclosed is an olefin-based polymer having a GPC-LS Characterization value (Y) of greater than 2.1 and having long chain branching. Long chain branching is characterized by a gpcBR value greater than 0.05 as determined by a Determination of gpcBR Branching Index by the 3D-GPC method, described infra. Also disclosed is an olefin-based polymer having a GPC-LS Characterization value (Y) of greater than 2.3 or greater than 2.4. Also disclosed is an olefin-based polymer with the given GPC-LS Characterization values (Y) in a range of from 2.1 to 10.

The methods according to embodiments may be high pressure free-radical reactor processes for the polymerization of the olefin, e.g. ethylene and, optionally, at least one comonomer, to produce a low density olefin-based polymer and byproduct heat. In embodiments, the free-radical polymerization is a peroxide-initiated free-radical polymerization, such that a peroxide-based initiator may be used. In embodiments, the free-radical polymerization is a high pressure peroxide-initiated free-radical polymerization. In embodiments, a metal catalyst may be included in addition to the peroxide initiator. In other embodiments, no metal catalyst may be included.

As used herein, the term "high pressure" refers to a pressure greater than 100 MPa, greater than 110 MPa, greater than 120 MPa, greater than 130 MPa, greater than 140 MPa, or even greater than 150 MPa. In embodiments, the pressure may range from greater than or equal to 100 MPa to less than or equal to 400 MPa, from greater than or equal to 110 MPa to less than or equal to 390 MPa, from greater than or equal to 120 MPa to less than or equal to 380 MPa, from greater than or equal to 130 MPa to less than or equal to 370 MPa, from greater than or equal to 140 MPa to less than or equal to 360 MPa, from greater than or equal to 150 MPa to less than or equal to 350 MPa, from greater than or equal to 160 MPa to less than or equal to 340 MPa, from greater than or equal to 170 MPa to less than or equal to 330 MPa, from greater than or equal to 180 MPa to less than or equal to 320 MPa, from greater than or equal to 190 MPa to less than or equal to 310 MPa, or even from greater than or equal to 200 MPa to less than or equal to 300 MPa The methods according to embodiments may include at least one high-activity CTA, and in some cases a mixture of at least one high-activity CTA and at least one low-activity CTA, as those terms are defined above, to assist in the formation of a narrower molecular weight distribution low density olefin-based polymer relative to polymers produced under traditional processes.

In embodiments, the reactor system may include a reactor having one or more reaction zones. The reactor may be an autoclave reactor, a tubular reactor, or a mixture of an autoclave reactor and a tubular reactor. The two types of reactors allow for two different high pressure free-radical initiated polymerization process types. In the first process type, an agitated autoclave reactor having one or more reaction zones is charged with initiator or monomer feed or both through at least one injection point. In the second process type, the tubular reactor is a jacketed tube having one or more reaction zones. Suitable, but not limiting, reactor lengths may be from 100 meters to 3000 meters, or from 1000 meters to 2000 meters. The beginning of a reaction zone, for either type of reactor, is typically defined by the side injection of either initiator of the reaction, olefin, CTA, comonomer(s), or any combination thereof. A high pressure process can be carried out in autoclave reactors or tubular reactors having one or more reaction zones, or in a combination of autoclave reactors and tubular reactors, each comprising one or more reaction zones.

In some embodiments, the methods for making the olefin-based polymer may include injecting an initiator into the high pressure feed upstream of the reaction zone where free radical polymerization is to be induced. Thus, initiating the free-radical polymerization may include adding a peroxide initiator to the reactor system. Examples of free radical initiators include oxygen-based initiators such as organic peroxides (PO). Exemplary initiators may include, but are not limited to, t-butyl peroxy pivalate, di-t-butyl peroxide, t-butyl peroxy acetate, t-butyl peroxyoctoate, and t-butyl peroxy-2-ethylhexanoate, and mixtures thereof. These organic peroxy initiators may be injected into the reactor system at example amounts of from 0.0001% to 0.01% by weight initiator, based on the total weight of high pressure feed.

Referring to a tubular reactor, besides feeding the tubular reactor olefin and, optionally, at least one comonomer, other components may be fed to the reactor to initiate and support the free radical reaction as the olefin-based polymer is formed. The additional components may include, but are not limited to, reaction initiators, catalysts, and CTAs. In embodiments, the tubular reactor is a multi-zone tubular reactor with alternate locations of feeding fresh olefin to control the olefin to CTA ratio and therefore control polymer properties. Fresh olefin monomer is simultaneously added in multiple locations to achieve the desired olefin monomer to CTA ratio. Fresh CTA can be simultaneously added in multiple locations to achieve the desired CTA to olefin monomer ratio. Nonlimiting examples of suitable tubular polymerization reactors include the tubular reactor and polymerization conditions as disclosed in WO2013059042 (A1) and WO2013078018(A2), the entire content of each reference being incorporated by reference herein.

In an embodiment, the reactor system of the free-radical polymerization includes a tubular reactor having multiple reactor zones (from 3 to 6 reactor zones). The maximum temperature in each reactor zone is from 150° C. to 360° C., or from 170° C. to 350° C., or from 200° C. to 340° C. The pressure in each reactor zone is from 100 MPa to 380 MPa, or from 110 MPa to 340 MPa, or from 110 MPa to 300 MPa.

In embodiments, the reactor system of the free-radical polymerization includes a tubular polymerization reaction in which a process fluid partially comprised of olefin is free-radically polymerized, creating a highly exothermic reaction. The reaction occurs under high operating pressure (100 MPa to 400 MPa) in turbulent process fluid flow (hence low density olefin-based polymers are also referred to as "high pressure" polymers) at maximum temperatures in the reactor of 160° C. to 360° C., while the initial initiation temperature for the reaction is between 120° C. to 200° C. At certain points along the tube, a portion of the heat produced during the free-radical polymerization may be removed through the tube wall. Typical single-pass conversion values for a tubular reactor range from about 20 percent to 40 percent. Tubular reactor systems typically also include at least one monomer recycle loop to improve conversion efficiency.

A typical tubular polymerization reaction system is shown in FIG. 1. A tube reactor system 100 has a tube 2 with a length typically from about 250 meters to about 2000 meters. The length and diameter of the tube affects the residence time and velocity of the process fluid as well as the heat addition/removal capacity of tube 2. Suitable, but not limiting, reactor lengths can be from 100 meters to 3000 meters, and some from 500 meters to 2000 meters. Tube 2 also has a working internal diameter from about 30 mm to about 100 mm based upon desired system throughput, operational pressure range, and the degree of turbulent flow for mixing and reaction. The working internal diameter may widen and narrow at points along tube 2 to accommodate different portions of the process, such as turbulent mixing, injection of reaction initiators and feeds, and process fluid throttling (i.e., accelerating process fluid velocity at the expense of pressure loss).

In some embodiments, the average velocity of the process fluid is at least 10 meters per second or even up to and including 25 meters per second. Process fluid velocity may have an effect on overall process throughput, olefin conversion, heat removal capacity, and, for processes with a number of reaction zones, management of local reaction initiation temperatures and injection amounts of CTAs and process initiators.

Referring to FIG. 1 and tube reactor system 100, a primary compressor 4, which may be a multi-stage compressor or two or more compressors running in parallel, is connected at its intake side to a source of fresh monomer/comonomer feed, i.e. the fresh feed conduit 6, and a low pressure system recycle conduit 8.

Still referring to FIG. 1, a second compressor, e.g. a hypercompressor 5, which may be a multi-stage compressor, is connected at its intake to the discharge of the primary compressor 4 as well as the second of the two recycle streams, i.e the high pressure system recycle conduit 26.

After pressurization by the hypercompressor 5, the process fluid is fed into the tube 2 through conduit 12 as an upstream process feed stream. In some disclosed processes, the process fluid is split and fed to tube 2 at different feed locations. In such processes, part of the process fluid is fed to tube 2 through conduit 12 as an upstream process feed stream to the first reaction zone, and the other parts (depending on the number of splits made in the process fluid) may then be fed to tube 2 as downstream process feed streams to the other reaction zones through various conduits 14.

In some embodiments, the reactor system of the method may include several reaction zones to which may be added fresh feeds, including a first reaction zone and at least one other reaction zone. Having multiple reaction zones may improve overall olefin conversion by removing heat in the system through the introduction of feed streams (e.g., initiator, monomer) that are cooler than the process fluid in the tube 2 downstream of the first reaction zone. Tubular reactor systems with multiple reaction and feed zones may permit the tube reactor to operate at an overall lower average peak reactor temperature. This assumes that conversion between the multiple reactor or feed zones and analogous non-multiple reaction or feed zone tubular reactors are kept the same. Without intending to be bound by any particular theory, the downstream process feed passing through conduits 14 may be cooled before injection into the reaction system or the downstream process feed may be inherently colder, thereby reducing the overall reaction process fluid temperature before (re)initiation of polymerization. Cooling of the process might permit additional initiator to be added, thereby improving single-pass conversion of monomer/comonomers. In some embodiments, the temperature of the downstream process feed stream(s) is preferably below 120° C., or below 50° C., or even below 30° C. Lower average reactor temperatures may reduce the overall level of long chain branching, which may produce narrower molecular-weight-distribution products. Additionally, the use of multiple feed locations along the tube may produce narrow molecular-weight-distribution resins for use in applications such as film resins where optical properties may be an important criterion. Multiple feed locations may also result in a narrowing of the molecular weight distribution relative to analogous systems that do not have multiple reaction zones.

In some embodiments, the reactor system includes a reactor having more than one reaction zone. In such a reactor, one or more free-radical initiator or catalyst conduits 7 convey initiator or catalyst to tube 2 near or at the beginning of each reaction zone.

The free-radical polymerization reaction resulting in the disclosed olefin-based polymer occurs in each reaction zone where initiator or catalyst is present. The reaction is an exothermic reaction that generates a large quantity of heat. Without cooling, the adiabatic temperature rise in the process fluid and the olefin-based polymer (which absorbs and retains heat) would result in unfavorable reactions. Such reactions may include olefin decomposition (where olefin and polyolefin break down in a combustion less reaction into base products) or excessive long chain branching, which would lead to a broadening of the molecular weight distribution.

In conventional processes, high molecular weight polymer chains form and "plate out" on the insides of reactor tube walls, insulating the process and hindering heat removal. In some embodiments, however, which include use of a high-activity CTA and a process fluid velocity above 10 meters per second, the extent to which this insulative layer forms is reduced. This improves the heat removal process versus a comparable process that does not use a high-activity CTA.

Without intending to be bound by any particular theory, it is believed that polymerization methods including high-activity CTAs present several advantages over polymerization methods in which the high-activity CTAs are not used. For instance, when delivering a high-activity CTA to the process instead of a low-activity CTA, the ability to remove heat from the tubular reactor during steady-state operations appears to have the following effects: (a) at least 1% more heat, and perhaps at least 3% more heat may be removed from at least one reaction zone; and/or (b) the average temperature difference between the inlet and the outlet temperatures (the temperature "delta") of a heat removal medium used in a heat exchanger that removes heat from a reaction system may be statistically significantly higher (i.e., greater than 3 times the standard deviation of the temperature delta over a fixed period of time) than that of an analogous heat removal medium used in an analogous heat exchanger in an analogous process; and/or (c) the difference in the outlet temperature of the heat removal medium used in a heat exchanger that removes heat from a reaction system may be at least 1° C. higher for a fixed period of time than that of an analogous heat removal medium used in an analogous heat exchanger in an analogous process.

In some embodiments, adding the CTA to the reactor system may include adding at least one high-activity CTA to the process fluid. In some embodiments, adding the CTA to the reactor system may include adding at least two CTAs—for example, one high-activity CTA and one low-activity CTA—to the process fluid. More than one CTA may be used to take advantage of relative properties during free-radical polymerization inside tube 2.

In some embodiments, CTAs are added so as to blend as homogeneously as possible with the process fluid before introduction to the tube 2. Depending on the physical layout of the tube reactor system 100 and chemical characteristics of the process fluid and the CTAs, such blending may be achieved by injecting the CTAs at the inlet of the booster compressor 21 for the low pressure system recycle conduit 8, in the inlet of the primary compressor 4, in the inlet of the hypercompressor 5, at the outlet of the hypercompressor 5, at the inlet of the tube 2, or together with the first peroxide injection.

Although not shown in FIG. 1, selective feeding of CTAs to the tube reactor 2 is possible. In such cases, the CTAs may be fed into the tube 2 selectively by being injected into conduits 12 or 14 instead of using the CTA source 23 as shown in FIG. 1. In specific cases, the CTAs may be injected from CTA source 23 only into the upstream process feed stream via conduit 12. This flexibility in the disclosed process regarding the injection of CTAs from CTA source 23 permits selective injection of CTAs only into the first reaction zone, or only into a different reaction zone, or into some or all of the reaction zones. It also permits the injection of different CTAs, including CTAs with different Cs characteristics, to be injected from CTA source 23 into different zones (e.g., a high-activity CTA injected into the first reaction zone and a low-activity CTA injected into at least one other reaction zone) to optimize reaction system performance and olefin-based polymer properties.

In embodiments in which more than one CTA is added to the reactor system, one of the CTAs may have Cs<1 and another CTA may have Cs>1. In such processes, the CTAs may be fed to the system at different feed rates or amounts so as to customize their effectiveness in different parts of the process or to optimize the olefin-based polymer properties. In embodiments, the feed rate of the low activity CTA may be regulated by the amount of recycled low activity CTA detected in either or both recycle streams 26 and 8. The feed amounts, ratio of CTAs to each other, and relative amount of CTA to the amount of olefin in the fresh feed conduit 6 will vary depending on several factors, including, but not limited to, the tube 2 and tube reactor system 100 geometry, production rates, the relative activities of the CTAs, and the overall tube 2 residence time. The feed amounts and ratio of CTAs may also be regulated based upon final olefin-based polymer characteristics, such as melt viscosity, overall production amount, target molecular weight distribution, desired melt index, first zone peak temperature, residual CTAs or CTA byproducts, and tube process fluid velocity.

In embodiments, the concentration of CTA in the process fluid is from about 1 molar ppm to about 600 molar ppm or from about 1 molar ppm to about 200 molar ppm. In embodiments, the disclosed CTA concentrations are found in the upstream process feed stream, such as conduit 12. In embodiments, the concentration of the high-activity CTA in the upstream process feed stream is from about 1 molar ppm to about 600 molar ppm or from about 1 molar ppm to about 200 molar ppm. In embodiments using both a high-activity CTA and a low-activity CTA, the CTA molar flow ratio, which is the ratio of the high-activty CTA in moles/hour to the low-activity CTA in moles/hour in the process fluid, is from about 0.01 to about 100 or from about 0.05 to about 5 or from about 0.05 to about 0.5.

Referring to FIG. 1, a mixture of olefin-based polymer formed from the reaction, unreacted monomer (and comonomer where applicable), and unused feeds, such as solvents and CTAs, or degradation and side reaction products, pass from the tube outlet 16 to the separations part of the process. The separating and recycling part of the tube reactor system 100 process includes a high pressure separator (HPS) 18, which receives the product polymer and process fluid mixture from the outlet of the tube 2. The tails of the HPS 18 conveys the polymer and any remaining unreacted monomer/comonomer and other unused feeds that might be dissolved with the polymer, to the low-pressure separator (LPS) 20. The higher pressure lights stream, which includes unreacted monomer, passes through the high pressure system recycle conduit 26, which may include a refining system 24 to cool and purify the stream and purge inert gases, and rejoins the process fluid passing from the primary compressor 4 to the hypercompressor 5.

When the heat removal medium is a liquid, the reactor may include a heat exchanger 30 to effect heat transfer and cool the process fluid and the olefin-based polymer.

In embodiments, there is an overall improvement in olefin conversion. The overall improvement comes from the reduction in formation of high-molecular weight polymer chains early in the process, from improvements in heat transfer, and from the ability to use more free-radical initiator. Given comparable steady state conditions, the olefin conversion for a disclosed process in which at least one CTA with a Cs greater than 1 is added to the reactor system may be at least 0.3 percent greater than the olefin conversion in an analogous process lacking a CTA with a Cs greater than 1.

End Uses

End-use products made using the disclosed olefin-based polymers include all types of films (for example, blown, cast, and extrusion coatings (monolayer or multilayer)), molded articles (for example, blow molded and rotomolded articles), wire and cable coatings and formulations, cross-linking applications, foams (for example, blown with open or closed cells), and other thermoplastic applications. The disclosed olefin-based polymers are also useful as a blend component with other polyolefins.

The types of films that may be produced as end-use products from embodiments of the disclosed olefin-based polymers include silage films, sealants, silobags, stretch films, display packaging, shrink films, and heavy duty shipping sacks. Additionally, blown, cast and extrusion coatings (monolayer or multilayer) also may be produced using the disclosed olefin-based polymers.

Definitions

The term "blend" or "polymer blend," as used herein, means a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art.

The term "composition" includes a mixture of materials which comprise the composition as well as reaction products and decomposition products formed from interaction and reaction between the materials of the composition.

The term "olefin-based polymer" refers to a polymer that is formed from more than 50 mole percent polymerized olefin monomer (based on the total amount of polymerizable monomers), and, optionally, one or more comonomers. A homopolymer of the olefin is also an olefin-based polymer.

The term "ethylene-based polymer" refers to a polymer that is formed from more than 50 mole percent polymerized ethylene monomer (based on the total amount of polymerizable monomers), and, optionally, one or more comonomers. A homopolymer of ethylene is also an ethylene-based polymer.

The term "ethylene/α-olefin interpolymer" refers to an interpolymer that is formed from more than 50 mole percent polymerized ethylene monomer (based on the total amount of polymerizable monomers), and at least one α-olefin comonomer.

The term "homopolymer" refers to a polymer that is formed from only a single type of monomer, such as ethylene.

The term "interpolymer" refers to polymers prepared by the copolymerization of at least two different types of monomers. The term interpolymer includes copolymers, usually employed to refer to polymers prepared from two different monomers, and polymers prepared from more than two different types of monomers, such as terpolymers.

The term "LDPE" may also be referred to as "high pressure ethylene polymer" or "highly branched polyethylene" and is defined to mean that the polymer is partly or entirely polymerized in autoclave or tubular reactors at pressures above 100 MPa with the use of free-radical initiators, such as peroxides (see, for example, U.S. Pat. No. 4,599,392 (McKinney, et al.)).

The term "polymer" refers to a compound prepared by polymerizing one or more monomers, whether of the same or a different type of monomer. The term polymer embraces the terms "homopolymer" and "interpolymer."

Testing Methods

Density: Samples for density measurement of a polymer are prepared according to ASTM D 1928. Measurements are made within one hour of sample pressing using ASTM D792, Method B.

Melt Index: Melt index, or I2, of an ethylene-based polymer is measured in accordance with ASTM D 1238, Condition 190° C./2.16 kg.

Melt Strength: Melt strength measurements are conducted on a Gottfert Rheotens 71.97 (Göettfert Inc.; Rock Hill, S.C.) attached to a Gottfert Rheotester 2000 capillary rheometer. A polymer melt is extruded through a capillary die with a flat entrance angle (180 degrees) with a capillary diameter of 2.0 mm and an aspect ratio (capillary length/capillary radius) of 15. After equilibrating the samples at 190° C. for 10 minutes, the piston is operated at a constant piston speed of 0.265 mm/second. The standard test temperature is 190° C. The sample is drawn uniaxially to a set of accelerating nips located 100 mm below the die with an acceleration of 2.4 mm/second$^2$. The tensile force is recorded as a function of the take-up speed of the nip rolls. Melt strength is reported as the plateau force (cN) before the strand breaks. The following conditions are used in the melt strength measurements: Plunger speed=0.265 mm/second; wheel acceleration=2.4 mm/s$^2$; capillary diameter=2.0 mm; capillary length=30 mm; and barrel diameter=12 mm.

Dynamic Mechanical Spectroscopy (DMS): Dynamic oscillatory shear measurements are performed with the ARES system of TA Instruments (New Castle, Del.) at 190° C. using 25 mm parallel plates at a gap of 2.0 mm and at a constant strain of 10% under an inert nitrogen atmosphere. The frequency interval is from 0.03 to 300 radians/second at 5 points per decade logarithmically spaced. The stress response is analyzed in terms of amplitude and phase, from which the storage modulus (G'), loss modulus (G"), complex modulus (G*), tan δ, phase angle δ and complex viscosity (η*) are calculated. The complex modulus, G*, is a complex number with G' as its real and G" as its imaginary components, respectively (G*=G'+iG"). The magnitude of G* is reported as |G*|=(G'$^2$+G"$^2$)$^{1/2}$. Both tan δ and the phase angle δ are related to the material's relative elasticity. Tan δ is the ratio of the loss modulus to the storage modulus, that is tan δ=G"/G', and the phase angle δ can be obtained from δ=tan$^{-1}$(G"/G'). The complex viscosity η* is also a complex number with η' as its real and η" as its imaginary components. The magnitude of η* is reported as:

$$\eta^* = (\eta''^2 + \eta'^2) = \left[\left(\frac{G''}{\omega}\right)^2 + \left(\frac{G'}{\omega}\right)^2\right]^{1/2},$$

where ω is the angular frequency in radians/second.

DSC: Differential Scanning Calorimetry (DSC) can be used to measure the crystallinity of a sample at a given temperature for a wide range of temperatures. For example, a TA Instruments Q1000 DSC, equipped with a RCS (Refrigerated Cooling System) and an autosampler module is used to perform this analysis. During testing, a nitrogen purge gas flow of 50 ml/min is used. Each sample is pressed into a thin film and melted in the press at about 175° C.; the melted sample is then air-cooled to room temperature (~25° C.). A 3-10 mg, 6 mm diameter specimen is extracted from the cooled polymer, weighed, placed in a light aluminum pan (~50 mg), and crimped shut. Analysis is then performed to determine the thermal properties of the specimen. The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak crystallization temperature ($T_c$), the heat of fusion ($H_f$) (in Joules per gram), and the % crystallinity for polyethylene samples calculated using Equation 1:

% Crystallinity=[($H_f$ (J/g))/(292 J/g)]×100     (Eq. 1)

The heat of fusion ($H_f$) and the peak melting temperature are reported from the second heat curve. The peak crystallization temperature is determined from the cooling curve.

Triple Detector Gel Permeation Chromatography: The Triple Detector Gel Permeation Chromatography (3D-GPC or TD-GPC) system consists of a Waters (Milford, Mass.) 150° C. high temperature chromatograph (other suitable high temperature GPC instruments include Polymer Laboratories (Shropshire, UK) Model 210 and Model 220 equipped with an on-board differential refractometer (RI)). Additional detectors can include an IR4 infra-red detector from Polymer ChAR (Valencia, Spain), Precision Detectors (Amherst, Mass.) 2-angle laser light scattering (LS) detector Model 2040, and a Viscotek (Houston, Tex.) 150R 4-capillary solution viscometer. A GPC with these latter two independent detectors and at least one of the former detectors is sometimes referred to as "3D-GPC" or "TD-GPC" while the term "GPC" alone generally refers to conventional GPC. Depending on the sample, either the 15° angle or the 90° angle of the light scattering detector is used for calculation purposes. Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

Suitable high temperature GPC columns can be used including, but not limited to, four 30 cm long Shodex HT803 13 micron columns or four 30 cm Polymer Labs columns of 20-micron mixed-pore-size packing (MixA LS, Polymer Labs). The sample carousel compartment is operated at 140°

C., and the column compartment is operated at 150° C. The samples are prepared at a concentration of 0.1 grams of polymer in 50 milliliters of solvent. The chromatographic solvent and the sample preparation solvent contain 200 ppm of butylated hydroxytoluene (BHT) in trichloro benzene (TCB). Both solvents are sparged with nitrogen. The polyethylene samples are gently stirred at 160° C. for four hours. The injection volume is 200 microliters. The flow rate through the GPC is set at 1 ml/minute.

The GPC column set is calibrated by running 21 narrow molecular weight distribution polystyrene standards. The molecular weight (MW) of the standards range from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000,000 and 0.05 g in 50 mL of solvent for molecular weights less than 1,000,000. The polystyrene standards are dissolved at 80° C. with gentle agitation for 30 minutes. The narrow standard mixtures are run first and in order of decreasing amount of the highest molecular weight component to minimize degradation. The polystyrene standard peak molecular weights are converted to polyethylene molecular weights using Equation 2 (as described in Williams and Ward, *J. Polym. Sci.*, Polym. Let., 6, 621 (1968)):

$$M_{polyethylene} = A \times (M_{polystyrene})^B \quad \text{(Eq. 2)}$$

where M is the molecular weight of polyethylene or polystyrene (as marked), and B is equal to 1.0. A may be in a range of about 0.38 to about 0.44 and is determined at the time of calibration using a broad molecular weight distribution polyethylene standard, as outlined in the gpcBR Branching Index by 3D-GPC method, infra, and specifically Equation 9. Use of this polyethylene calibration method to obtain molecular weight values, such as $M_w/M_n$, and related statistics, is defined here as the method of Williams and Ward.

The systematic approach for the determination of multi-detector offsets is performed in a manner consistent with that published by Balke, Mourey, et al. (Mourey and Balke, Chromatography Polym., Chapter 12, (1992)) (Balke, Thitiratsakul, Lew, Cheung, Mourey, Chromatography Polym., Chapter 13, (1992)), optimizing triple detector log ($M_w$ and intrinsic viscosity) results from Dow 1683 broad polystyrene (American Polymer Standards Corp.; Mentor, Ohio) or its equivalent to the narrow standard column calibration results from the narrow polystyrene standards calibration curve. The molecular weight data is obtained in a manner consistent with that published by Zimm (Zimm, B. H., J. Chem. Phys., 16, 1099 (1948)) and Kratochvil (Kratochvil, P., *Classical Light Scattering from Polymer Solutions*, Elsevier, Oxford, N.Y. (1987)). The overall injected concentration used in the determination of the molecular weight is obtained from the mass detector area and the mass detector constant derived from a suitable linear polyethylene homopolymer, or one of the polyethylene standards of known weight average molecular weight. The calculated molecular weights are obtained using a light scattering constant derived from one or more of the polyethylene standards mentioned and a refractive index concentration coefficient, do/dc, of 0.104. Generally, the mass detector response and the light scattering constant should be determined from a linear standard with a molecular weight in excess of about 50,000 daltons. The viscometer calibration can be accomplished using the methods described by the manufacturer or alternatively by using the published values of suitable linear standards such as Standard Reference Materials (SRM) 1475a, 1482a, 1483, or 1484a. The chromatographic concentrations are assumed low enough to eliminate addressing $2^{nd}$ viral coefficient effects (concentration effects on molecular weight).

gpcBR Branching Index by 3D-GPC: In the 3D-GPC configuration, the polyethylene and polystyrene standards can be used to measure the Mark-Houwink constants, K and α, independently for each of the two polymer types, polystyrene and polyethylene. These can be used to refine the Williams and Ward polyethylene equivalent molecular weights in application of the following methods.

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the refractive index chromatogram. Linear polyethylene standards are then used to establish polyethylene and polystyrene Mark-Houwink constants as described previously. Upon obtaining the constants, the two values are used to construct two linear reference conventional calibrations for polyethylene molecular weight and polyethylene intrinsic viscosity as a function of elution volume, as shown in Equations 3 and 4:

$$M_{PE} = \left(\frac{K_{PS}}{K_{PE}}\right)^{\frac{1}{\alpha_{PE}+1}} \cdot M_{PS}^{\frac{\alpha_{PS}+1}{\alpha_{PE}+1}} \quad \text{(Eq. 3)}$$

$$[\eta]_{PE} = K_{PS} \cdot \frac{M_{PS}^{\alpha+1}}{M_{PE}} \quad \text{(Eq. 4)}$$

The gpcBR branching index is a robust method for the characterization of long chain branching as discussed in Yau, Wallace W., "Examples of Using 3D-GPC-TREF for Polyolefin Characterization", *Macromol. Symp.*, 2007, 257, 29-45. The index avoids the slice-by-slice 3D-GPC calculations traditionally used in the determination of g' values and branching frequency calculations in favor of whole polymer detector areas. From 3D-GPC data, one can obtain the sample bulk absolute weight average molecular weight ($M_{w,Abs}$) by the light scattering (LS) detector using the peak area method.

With 3D-GPC, absolute weight average molecular weight ("$M_{w,Abs}$") and intrinsic viscosity are also obtained independently using Equations 5 and 6:

$$M_w = \sum_i w_i M_i \quad \text{(Eq. 5)}$$
$$= \sum_i \left(\frac{C_i}{\sum_i C_i}\right) M_i$$
$$= \frac{\sum_i C_i M_i}{\sum_i C_i}$$
$$= \frac{\sum_i LS_i}{\sum_i C_i}$$
$$= \frac{LS \text{ Area}}{Conc. \text{ Area}}$$

The area calculation in Equation 5 offers more precision because as an overall sample area it is much less sensitive to variation caused by detector noise and GPC settings on baseline and integration limits. More importantly, the peak area calculation is not affected by the detector volume offsets. Similarly, the high-precision sample intrinsic viscosity (IV) was obtained by the area method shown in Equation 6:

$$IV = [\eta] \quad \text{(Eq. 6)}$$
$$= \sum_i w_i IV_i$$
$$= \sum_i \left(\frac{C_i}{\sum_i C_i}\right) IV_i$$
$$= \frac{\sum_i C_i IV_i}{\sum_i C_i}$$
$$= \frac{\sum_i DP_i}{\sum_i C_i}$$
$$= \frac{DP \text{ Area}}{\text{Conc. Area}},$$

where $DP_i$ stands for the differential pressure signal monitored directly from the online viscometer.

To determine the gpcBR branching index, the light scattering elution area for the sample polymer is used to determine the molecular weight of the sample. The viscosity detector elution area for the sample polymer is used to determine the intrinsic viscosity (IV or [η]) of the sample.

Initially, the molecular weight and intrinsic viscosity for a linear polyethylene standard sample, such as SRM1475a or an equivalent, are determined using the conventional calibrations ("cc") for both molecular weight and intrinsic viscosity as a function of elution volume, per Equations 7 and 8:

$$M_{w_{CC}} = \sum_i \left(\frac{C_i}{\sum_i C_i}\right) M_i = \sum_i w_i M_{CC,i} \quad \text{(Eq. 7)}$$

$$[\eta]_{CC} = \sum_i \left(\frac{C_i}{\sum_i C_i}\right) IV_i = \sum_i w_i IV_{CC,i} \quad \text{(Eq. 8)}$$

Equation 9 is used to determine the gpcBR branching index:

$$gpcBR = \left[\left(\frac{[\eta]_{CC}}{[\eta]}\right) \cdot \left(\frac{M_w}{M_{w,cc}}\right)^{\alpha_{PE}} - 1\right] \quad \text{(Eq. 9)}$$

wherein [η] is the measured intrinsic viscosity, $[\eta]_{cc}$ is the intrinsic viscosity from the conventional calibration, $M_w$ is the measured weight average molecular weight, and $M_{w,cc}$ is the weight average molecular weight of the conventional calibration. The weight average molecular weight by light scattering (LS) using Equation (5) is commonly referred to as "absolute weight average molecular weight" or "$M_{w,Abs}$". The $M_{w,cc}$ from Equation (7) using conventional GPC molecular weight calibration curve ("conventional calibration") is often referred to as "polymer chain backbone molecular weight", "conventional weight average molecular weight," and "$M_{w,GPC}$."

All statistical values with the "cc" subscript are determined using their respective elution volumes, the corresponding conventional calibration as previously described, and the concentration ($C_i$) derived from the retention volume molecular weight calibration. The non-subscripted values are measured values based on the mass detector, LALLS, and viscometer areas. The value of $K_{PE}$ is adjusted iteratively until the linear reference sample had a gpcBR measured value of zero. For example, the final values for a and Log K for the determination of gpcBR in this particular case are 0.725 and −3.355, respectively, for polyethylene, and 0.722 and −3.993, respectively, for polystyrene.

Once the K and α values are determined using the procedure discussed previously, the procedure is repeated using the branched samples. The branched samples are analyzed using the final Mark-Houwink constants as the best "cc" calibration values, and Equations 5-8 are applied.

The interpretation of gpcBR is as follows: For linear polymers, gpcBR calculated from Equation 9 will be close to zero, because the values measured by LS and viscometry will be close to the conventional calibration standard. For branched polymers, gpcBR will be higher than zero, especially with high levels of long chain branching, because the measured polymer molecular weight will be higher than the calculated $M_{w,cc}$, and the calculated $IV_{cc}$ will be higher than the measured polymer IV. In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular Examples, the advantage of using gpcBR in comparison to a traditional "g'' index" and branching frequency calculations is due to the higher precision of gpcBR. All of the parameters used in the gpcBR index determination are obtained with good precision and are not detrimentally affected by the low 3D-GPC detector response at high molecular weight from the concentration detector. Errors in detector volume alignment also should not affect the precision of the gpcBR index determination.

Zero Shear Viscosity: Specimens for creep measurements are prepared on a programmable Tetrahedron bench top press. The program holds the melt at 177° C. for 5 minutes at a pressure of $10^7$ Pa. The chase is then removed to the bench to cool to room temperature. Round test specimens are then die-cut from the plaque using a punch press and a handheld die with a diameter of 25 mm. The specimen is about 1.8 mm thick.

Zero-shear viscosities are obtained via creep tests that are conducted on an AR-G2 stress controlled rheometer (TA Instruments; New Castle, Del.) using 25-mm-diameter parallel plates at 190° C. Two thousand ppm antioxidant, a 2:1 mixture of IRGAFOS 168 and IRGANOX 1010 (Ciba Specialty Chemicals; Glattbrugg, Switzerland), are added to stabilize each sample prior to compression molding. The rheometer oven is set to a test temperature of 190° C. for at least 60 minutes prior to zeroing fixture. At the testing temperature, a compression molded sample disk is inserted between the plates and allowed to come to equilibrium for 5 minutes. The upper plate is then lowered to 50 µm above the desired testing gap (1.5 m). Any superfluous material is trimmed and the upper plate is lowered to the desired gap. Measurements are performed under nitrogen purging at a flow rate of 5 L/min. The default creep time is set for 6 hours.

A low shear stress of 5 Pa to 20 Pa is applied for all of the samples to ensure that the steady state shear rate is low enough to be in the Newtonian region. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the samples reach steady state within 6 hours. The steady state shear rate is determined from the slope of the linear regression of all of the data points in the last 10% time window of the plot of s vs. t, where s is strain. The zero-shear viscosity is determined from the ratio of the applied stress to the steady state shear rate.

A dynamic oscillatory shear test is conducted before and after the creep test on the same specimen from 0.1 rad/s to 100 rad/s at 10% strain. The complex viscosity values of the two tests are compared. If the difference of the viscosity values at 0.1 rad/s is greater than 5%, the sample is considered to have degraded during the creep test, and the result is discarded.

Surface and Internal Haze: Samples measured for internal haze and overall haze are sampled and prepared according to ASTM D 1003. A Hazegard Plus (BYK-Gardner USA; Columbia, Md.) is used for testing. Surface haze is determined as the difference between overall haze and internal haze. Surface haze tends to be related to the surface roughness of the film, where surface haze increases with increasing surface roughness. The surface haze to internal haze ratio is the surface haze value divided by the internal haze value.

Blown Film Fabrication Conditions: The sample films are extrusion blown films produced on a 45 mm COVEX Monolayer Blown Film Line (Barcelona, Spain) using the conditions in Table 1.

TABLE 1

Extrusion blown film processing conditions for producing samples used in Surface and Internal Haze tests.

| Variable | Value | Unit |
| --- | --- | --- |
| Air temperature at cooling ring | 23 | ° C. |
| Amps | 23 | A |
| Average thickness | 50 | μm |
| Blow up ratio | 2.5 | — |
| Die gap | 1 | mm |
| Frost line height | 300 | mm |
| Layflat | 584 | mm |
| Line speed | 9.5 | m/min |
| Melt pressure, adapter | 0 | bar |
| Melt pressure, barrel | 203 | bar |
| Melt temperature, adapter | 213 | ° C. |
| Melt temperature, barrel | 194 | ° C. |
| Output rate | 29 | kg/h |
| RPM | 77 | rpm |
| Volts | 250 | V |

Figure 2:
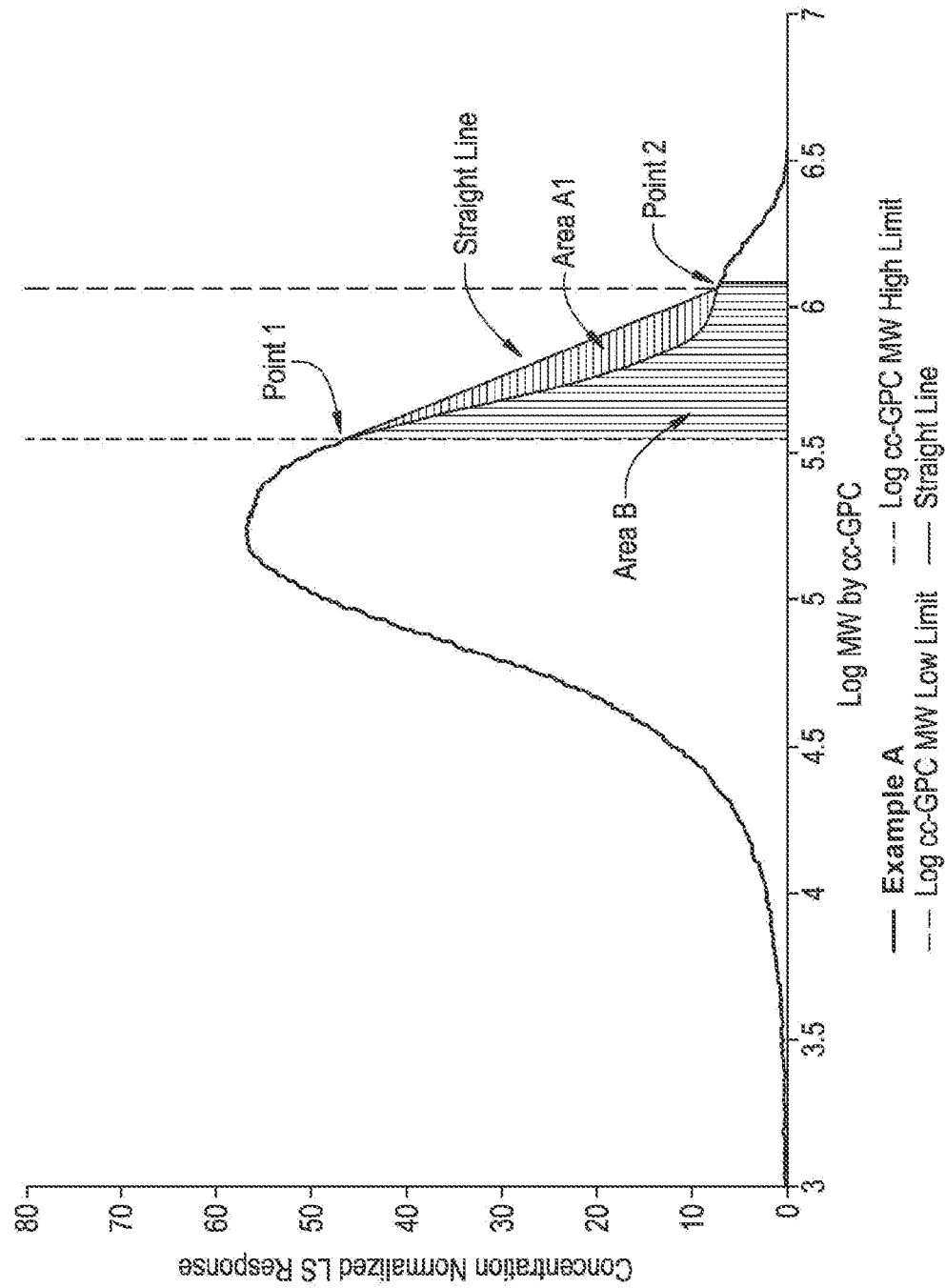
FIG. 2 is a concentration-normalized light scattering (LS) chromatograph curve for a range of log conventionally calibrated GPC molecular weight and parts of the GPC-LS Characterization analysis for an exemplary system described herein.

GPC-LS Characterization: Analysis of a concentration-normalized LS chromatogram response curve for a particular sample using a pre-determined molecular weight range is useful in differentiating the embodiment polymers from analogous and commercially available ethylene-based polymers of comparatively low density. The "GPC-LS Characterization" parameter, Y, is designed to capture the unique combination of molecular weight distribution (MWD) and the GPC-LS profile for a specific material. The properties of interest are melt index ($I_2$), MWD, long-chain branching, and haze. Desirable attributes for a polymer with a low haze are higher melt index ($I_2$), narrower MWD, and lower long-chain branching values. The GPC-LS Characterization value is designed to capture the features of low long-chain branching, narrow MWD, and high melt index ($I_2$). FIG. 2 provides an example and guide for using the GPC-LS.

Characterization method to identify inventive embodiments: An ethylene-based polymer that has long chain branching, such as low density ethylene-based polymers, can be differentiated by using an analysis technique called "GPC-LS Characterization." In the GPC-LS Characterization method, the determination is made using the light scattering (LS) detector response for a sample processed by a conventionally calibrated 3D-GPC ("cc-GPC") over a range of molecular weights of the sample. The molecular weights of the sample are converted to logarithm values for scaling purposes. The LS response is "concentration-normalized" so the LS response can be compared between samples, as it is known in the art that the unnormalized LS signals can vary greatly from sample to sample without normalization. When plotted, the logarithm values of range of the cc-GPC molecular weights and the concentration-normalized LS values form a concentration-normalized LS chromatogram curve such as the one shown in FIG. 2.

Once the concentration-normalized LS chromatogram curve is available, the determination of the GPC-LS Characterization value is straightforward. In the GPC-LS Characterization method, a GPC-LS Characterization value (Y) is determined using equation 10:

$$Y=(0-x)\cdot(A/B) \qquad (\text{Eq. 10})$$

The GPC-LS Characterization value is a relationship between two associated areas (A and B) and an indexed slope of a line (x) between two points on the concentration-normalized LS chromatogram curve at the logarithmic values of two specified cc-GPC molecular weight values. The specified cc-GPC molecular weight values attempt to bracket a molecular weight fraction that is known to contain polymer chains with long chain branching.

The first step in the analysis is generation of the concentration-normalized LS chromatogram curve representing concentration-normalized LS response values versus the logarithmic values of cc-GPC molecular weights for the polymer being examined.

The second step is to draw a straight line between two points on the concentration-normalized LS chromatogram curve. The straight line and the points will provide the basis for determination of areas A and B. The two points, a first point and a second point, are located on the concentration-normalized LS chromatogram curve and represent the concentration-normalized LS response values (a first and a second concentration-normalized LS response values) at the logarithm values for two cc-GPC molecular weight values (a first and a second logarithmic cc-GPC molecular weight values). The first point (Point 1 on FIG. 2) is defined as being on the concentration-normalized LS chromatogram curve (representing the first concentration-normalized LS response value) corresponding to the logarithm value of cc-GPC molecular weight 350,000 grams/mole (representing the first logarithmic cc-GPC molecular weight value), which is a value of approximately 5.54. The second point (Point 2 on FIG. 2) is defined as being along the concentration-normalized LS chromatogram curve at the concentration-normalized LS response value (representing the second concentration-normalized LS response value) corresponding to a logarithm value of cc-GPC molecular weight 1,150,000 grams/mole (representing the second logarithmic cc-GPC molecular weight value), which is a value of approximately 6.06. It is known in the art that differentiation in long chain branching typically is shown around 1 million grams/mole cc-GPC molecular weight.

The third step is to determine the area A between the straight line and the concentration-normalized LS chromatogram curve between the two logarithmic cc-GPC molecular weight values. Area A is defined as being the value of A1 minus A2. In embodiments, the area A is defined for the range of values between the logarithm value of cc-GPC molecular weight 350,000 grams/mole and the logarithm value of cc-GPC molecular weight 1,150,000 grams/mole.

A1 is defined as the area bound between the straight line and the normalized LS chromatogram curve where the concentration-normalized LS response value of the straight line is greater than the concentration-normalized LS response value for the concentration-normalized LS chromatogram curve between the two logarithmic cc-GPC molecular weight values.

As can be seen in FIG. 2, the area defined as A1 fills the entire range between the two logarithmic cc-GPC molecular weights; therefore A=A1. In many cases the straight line will be "above" the concentration-normalized LS chromatogram curve for the logarithmic cc-GPC molecular weight range and will not intersect with the concentration-normalized LS chromatogram curve except at Points 1 and 2. In these cases, A=A1 and A2=0. In some embodiments, however, A is not equal to A1. The concentration-normalized LS chromatogram curve shown in FIG. 3 shows an example of when this may occur.

In some embodiments, as can be seen in FIG. 3, the straight line may intersect with the concentration-normalized LS chromatogram curve in at least one other point besides Points 1 and 2 (see FIG. 3 at "Straight Line Intersection"). In such situations, A1 is determined as previously defined. For the example shown in FIG. 3, A1 would be the area between the concentration-normalized LS chromatogram curve and the straight line between the logarithm cc-GPC molecular weight value of approximately 5.8 to the logarithm value of cc-GPC molecular weight 1,150,000 grams/mole.

A2 is defined as the inverse of A1. A2 is the area bound between the straight line and the concentration-normalized LS chromatogram curve where the concentration-normalized LS response of the straight line is less than the concentration-normalized LS response for the concentration-normalized LS chromatogram curve between the two logarithmic cc-GPC molecular weight values. For the example shown in FIG. 3, A2 is the area between the concentration-normalized LS response curve and the straight line between the logarithm cc-GPC molecular weight value of approximately 5.8 to the logarithm value of cc-GPC molecular weight 350,000 grams/mole.

In calculating a total value for A, A is again defined as the area A1 minus the area A2. In some embodiments, as can be seen graphically in FIG. 3, A may result in a negative value, reflecting that the straight line defines more of an area below the concentration-normalized LS response curve than above it.

The fourth step is to determine the area B under the concentration-normalized LS chromatogram curve for the logarithmic cc-GPC molecular weight range. B is defined as the area under the concentration-normalized LS chromatogram curve between the two logarithmic cc-GPC molecular weight values. Area B does not depend upon the analysis of area A.

The fifth step is to determine the value of x, the slope indexing value. The value of x accounts for the slope of the straight line established for determining areas A and B. The value of x is not the slope of the straight line; however, it does represent a value reflective of the difference between Points 1 and 2. The value of x is defined by Equation 11:

$$x = \frac{LSresponse_{(Point2,CN)} - \frac{LSresponse_{(Point1,CN)}}{LSresponse_{(Point2,CN)}}}{\log MW_{(Point2,ccGPC)} - \log MW_{(Point1,ccGPC)}} \quad \text{(Eq. 11)}$$

where "LS response" are the concentration-normalized LS response values for Points 1 and 2, respectively, and "log MW" are the logarithmic cc-GPC molecular weights for Points 1 and 2, respectively. In some embodiments, the value of x is negative, indicating the straight line is downward sloping. In some embodiments, the straight line may intersect the normalized LS chromatogram curve at least once between Points 1 and 2.

Finally, once x, A, and B are established, the GPC-LS Characterization value (Y) is determined using the previously presented Equation 10.

When examining an LS chromatogram response curve, it is known that the size of the LS peak at about log MW 6 is related to the level of long chain branching in the polymer. The smaller the log MW 6 LS peak is, the value of the slope of the line segment in the LS plot becomes more negative, because the line is more steeply angled. This results in a more negative indexed slope of a line (x) value. A more negative x-value contributes to a higher positive value of Y, given the relationship in Equation 10.

The other term that contributes to Y in Equation 10 is the area ratio of A/B. The higher the A/B ratio, the higher the Y value. This ratio is affected by the melt index ($I_2$) and the MWD values of the polymer. These two values in turn affect how far the main polymer peak is pulled away from the LS pre-peak near the Log MW of 6 high MW region. A higher melt index ($I_2$) value means a lower MW, indicating a more distinct separation between the two response peaks. This would create a deeper valley between the high and low MW fractions. A deeper valley creates a larger area beneath the line segment, designated as "A." A narrow MWD means a less broad LS response curve and has the similar effect of creating a deeper valley in the plot, and again a larger area A.

Extrusion Multi-pass: A relative measurement of atmospheric stability (that is, resistance to oxidative attack and degradation) of two or more resins may be tested by passing polymer samples through a heated extruder several times under atmospheric conditions and then testing for physical characteristics, such as melt index ($I_2$), after each pass.

The polymer samples are processed through a LEISTRIZ micro-18 twin-screw extruder (obtained from American Leistritz Extruder Corporation, Somerville, N.J.). The extruder is controlled and driven by a HAAKE™ PolyLab System (Thermo Fischer Scientific; Waltham, Mass.) computer system. The extruder consists of 6 heating zones of 90 mm length each, and a heated die with a 3 mm strand orifice. The first zone is the feed throat and is jacket cooled with flowing water to prevent bridging of the feed polymer. The first zone is equipped with an open cone to receive the polymer feed from a K-TRON KV2T20 twin auger feeder (Pitman, N.J.). The five heated zones are set at 135° C., 165° C., 200° C., 220° C., and 220° C., respectively. The die at the end of the extruder is heated to 220° C.

Each screw has a diameter of 18 mm and a length of 540 mm, resulting in an L/D ratio of 30. The screw stack for the first five zones consists of an open forwarding design with a 30 degree pitch (off vertical). The final zone of the screw stack is a slightly narrower pitched forwarding design with a pitch of 20 degrees (off vertical). The overall screw design imparts little shear to the polymer and primarily forwards the material through the heated barrel sections. The molten polymer is compressed near the end of the screw through the tighter pitched element to provide enough back pressure to force the molten material through the die.

When processing, the screws turn at 250 rotations per minute (rpm). The polymer is fed to the extruder by the feeder with enough polymer to process as many passes as necessary while permitting the acquisition of a sample, preferably about 50 grams, after each pass for analysis.

The resultant molten polymer strand is delivered into a chilled water bath where it solidifies. After solidification, the polymer strand passes through an air knife to remove water before being cut by a strand chopper into polymer pellets. Upon pelletization, the sample for analysis is obtained before returning the remainder back into the feeder for additional processing, when necessary.

One or more features of the present disclosure are illustrated in view of the examples as follows:

EXAMPLES

Example 1: Polymerization—Autoclave Reactor

Additive A is Tris(Trimethylsilyl)Silane Obtained from Gelest, Inc.

Initiators: Peroxide initiator tert-butyl peroxyacetate (TPA, 20% by weight solution in ISOPAR™ H), and peroxide initiator ter-butyl peroxyoctoate (TPO), were combined with ISOPAR E, in a second 316 stainless steel supply vessel, to produce 3000 mass ppm TPA and 5000 mass ppm TPO (a ratio of 1:1 mole TPA/mole TPO). The vessel was padded, de-padded, five times with 70 psig nitrogen before use, and kept under nitrogen pad during operation.

Ethylene was injected at 5500 gm/hr, at a pressure of 193 MPa, into an agitated (1600 rpm) 300 mL high pressure CSTR reactor, with an external heating jacket set to control the internal reactor temperature at 215° C. Various chain transfer agents were added in series to determine the chain transfer effects of each. First, Propylene (CTA) was added to the ethylene stream at a pressure of 6.2 MPa, and controlled at a rate to produce a final product with a MI of 2 g/10 min, before the mixture was compressed to 193 MPa, and injected into the reactor. The solution of the appropriate additive solution was pumped at a pressure of 193 MPa directly into the reactor via a high pressure pump. The peroxide initiator solution was added directly to the reactor, through the sidewall, at a pressure of 193 MPa at a rate to control the ethylene conversion near 12%. In all experiments shown in Table 2, below, ISOPAR E was added at a rate of 40.7 grams/hour, TPA was added at a rate of 0.123 grams/hour, and TPO was added at a rate of 0.202 grams/hour. Comparative chain transfer agents were run to determine the relative Cs of the material. Comparative example 1 (ISOPAR E) was run at multiple concentrations to determine its Cs at the relevant temperature and pressure; this was determined to be 0.030. This value was used in subsequent calculations.

In the determination of the Cs of Additive A, it was necessary to feed it to the reactor diluted in ISOPAR E. To account for the additive chain transfer impact, the summed Cs of ISOPAR E and Additive A was determined from the relationship between molar feed of all CTAs v. molar feed of ethylene. Then, the determined Cs of ISOPAR E was subtracted to provide the isolated Cs of Additive A.

The details of the polymerization procedure for each experiment are shown in the tables below:

TABLE 2

Propylene and Additive A Mix Feeds, Ethylene Conversion, and Polymer Collected (Example 1)

| Experiment | Propylene (g/hr) | Additive A Mix feed ISOPAR E (g/hr) | Additive A Mix feed Additive A (g/hr) | Ethylene Conversion (%) | Polymer Collected (g/hr) |
|---|---|---|---|---|---|
| Control 1 | 107.5 | 0.0 | 0.00 | 12.5 | 547.9 |
| CE 1a | 107.7 | 92.2 | 0.00 | 12.5 | 557.5 |
| CE 1b | 10736.0 | 184.5 | 0.00 | 13.3 | 636.8 |
| CE 1c | 107.1 | 307.5 | 0.00 | 12.5 | 619.5 |
| Control 2 | 133.1 | 0.0 | 0.00 | 10.1 | 682.1 |
| IE 1a | 133.1 | 74.2 | 3.09 | 10.2 | 681.1 |
| IE 1b | 132.9 | 148.4 | 6.18 | 11.7 | 726.2 |
| IE 1c | 133.0 | 222.5 | 9.27 | 11.4 | 682.2 |
| Control 3 | 107.5 | 0.0 | 0.00 | 11.5 | 627.4 |
| IE 1d | 107.8 | 61.5 | 0.62 | 12.8 | 698.9 |
| IE 1e | 107.7 | 153.7 | 1.55 | 11.9 | 646.8 |
| IE 1f | 107.4 | 307.3 | 3.10 | 13.3 | 724.0 |

TABLE 3

Autoclave Polymerization Conditions (at 28,000 psi reactor pressure and at 215° C.)

| Sample | Propylene (mol ppm) | Total ISOPAR E (mol ppm) | $I_2$, 2.16 kg @ 190° C. (dg/min) | $\chi_n$ | [CTA]/[C2] |
|---|---|---|---|---|---|
| Control 1 | 13000 | 1714 | 2.4 | 663.8 | 0.001717 |
| Control 1 | 13000 | 1714 | 2.5 | 660.3 | 0.001717 |
| Control 1 | 13000 | 1714 | 2.0 | 676.0 | 0.001717 |
| CE1a | 13000 | 4714 | 3.6 | 634.7 | 0.004736 |
| CE1a | 13000 | 4714 | 3.8 | 630.7 | 0.004736 |
| CE1a | 13000 | 4714 | 2.9 | 649.4 | 0.004736 |
| CE1b | 13000 | 7714 | 5.2 | 600.0 | 0.007774 |
| CE1b | 13000 | 7714 | 5.1 | 610.2 | 0.007774 |
| CE1b | 13000 | 7714 | 5.2 | 609.0 | 0.007774 |
| CE1c | 13000 | 11714 | 12.4 | 549.2 | 0.011853 |
| CE1c | 13000 | 11714 | 9.5 | 567.8 | 0.011853 |
| CE1c | 13000 | 11714 | 13.4 | 543.6 | 0.011853 |

TABLE 4

Autoclave Polymerization Conditions (at 28,000 psi reactor pressure and at 215° C.)

| Sample | Propylene (mol ppm) | Additive A (mol ppm) | Total ISOPAR E (mol ppm) | $I_2$, 2.16 kg @190° C. (dg/min) | $\chi_n$ | [CTA]/[ethylene] |
|---|---|---|---|---|---|---|
| Control 2 | 16000 | 0 | 1680 | 1.6 | 690.6 | 0 |
| Control 2 | 16000 | 0 | 1680 | 1.9 | 680.7 | 0 |
| Control 2 | 16000 | 0 | 1680 | 1.7 | 687.4 | 0 |
| IE1a | 16000 | 50 | 1680 | 13.1 | 545.1 | 5E−05 |
| IE1a | 16000 | 50 | 1680 | 15.5 | 533.9 | 5E−05 |
| IE1a | 16000 | 50 | 1680 | 13.5 | 543.0 | 5E−05 |
| IE1b | 16000 | 100 | 1680 | 55.4 | 445.6 | 0.0001 |
| IE1b | 16000 | 100 | 1680 | 60.8 | 439.1 | 0.0001 |
| IE1b | 16000 | 100 | 1680 | 67.8 | 431.6 | 0.0001 |
| IE1c | 16000 | 150 | 1680 | 207.3 | 354.3 | 0.00015 |
| IE1c | 16000 | 150 | 1680 | 221.4 | 349.7 | 0.00015 |
| IE1c | 16000 | 150 | 1680 | 193.9 | 358.9 | 0.00015 |
| Control 3 | 13000 | 0 | 1680 | 2.2 | 667.8 | 0 |
| Control 3 | 13000 | 0 | 1680 | 2.1 | 672.3 | 0 |

TABLE 4-continued

Autoclave Polymerization Conditions (at 28,000 psi reactor pressure and at 215° C.)

| Sample | Propyl-ene (mol ppm) | Addi-tive A (mol ppm) | Total ISOPAR E (mol ppm) | $I_2$, 2.16 kg @190° C. (dg/min) | $\chi_n$ | [CTA]/ [ethyl-ene] |
|---|---|---|---|---|---|---|
| Control 3 | 13000 | 0 | 1680 | 1.9 | 680.4 | 0 |
| IE1d | 13000 | 10 | 1680 | 3.9 | 629.3 | 1E–05 |
| IE1d | 13000 | 10 | 1680 | 2.7 | 654.1 | 1E–05 |
| IE1d | 13000 | 10 | 1680 | 3.0 | 646.4 | 1E–05 |
| IE1e | 13000 | 25 | 1680 | 10.2 | 562.4 | 2.5E–05 |
| IE1e | 13000 | 25 | 1680 | 12.0 | 551.5 | 2.5E–05 |
| IE1e | 13000 | 25 | 1680 | 12.6 | 548.2 | 2.5E–05 |
| IE1f | 13000 | 50 | 1680 | 35.0 | 477.3 | 5E–05 |
| IE1f | 13000 | 50 | 1680 | 42.2 | 464.4 | 5E–05 |
| IE1f | 13000 | 50 | 1680 | 49.2 | 453.8 | 5E–05 |

Cs was derived according to the Mayo equation (Mayo, F. R., Chain Transfer in the Polymerization of Styrene: The Reaction of Solvents with Free Radicals. *J. Am. Chem. Soc.* 1943, 65, 2324-2329):

$$\frac{1}{\chi_n} = \left(\frac{1}{\chi_n}\right)_0 + C_s \frac{[CTA]}{[M]} \quad \text{(Eq. 12)}$$

where $\chi_n$ is the number average degree of polymerization. $\chi_n$ is determined from the melt index ($I_2$) of the LDPE by the following relation (Mortimer, G. A., Chain Transfer in Ethylene Polymerization IV: Additional Study at 1360 Atm and 130° C. *J. Polym. Sci. A-1* 1970, 8, 1513-1523):

$$\chi_n = -159.3 \times \log(I_2) + 723.3 \quad \text{(Eq. 13)}$$

Example 2: Polymerization—Autoclave Reactor in Presence of Triethylsilane

Chemicals: CTA triethyl silane (CAS-Number: 617-86-7) had purity >95%, solvent was n-heptane, initiator was TBPA (Tx-F).

Methods: Experiment 1: A solution of 100 g silane in 200 g n-heptane was prepared. The initiator solution contained 9 g Trigonox F (t-butyl peroxyacetate) 35 wt % per 500 ml n-heptane. Experiment 2: The silane was used pure, as delivered. The concentration of the initiator solution was 2.8 g Trigonox F (t-butyl peroxyacetate) 35 wt % per 500 ml n-heptane.

Triethylsilane as CTA was evaluated in a 54 ml continuously stirred tank reactor. CTA injection with an HPLC pump was at the suction side of the third stage of the compressor at about 250 bar. The reservoir of the initiator solution was purged with nitrogen before loading the peroxide high pressure pump. The CTA feed tank was kept under air atmosphere. The capillaries between the reactor and pressure relief valve were heated to 140° C. The bottom of the magnetic drive agitator was water cooled using tap water at ambient temperature. Ethylene was fed completely through the agitator and the peroxide and CTA were fed into the ethylene prior to entry into the reactor. Experiments were conducted at 2000 bar. Reactor temperature was controlled using a heating mantel on the outside of the reactor to achieve a temperature of about 200° C. to about 220° C. Conversion on the reactor was adjusted by the flow rate of a peroxide mixture of Trigonox F (t-butyl peroxyacetate) diluted in n-heptane. Melt index was adjusted by adjusting the flow rate of either the pure compound being studied as a potential CTA or by adjusting the flow rate of a mixture of the compound in n-heptane, methyl ethyl ketone, isopropanol, or ethyl acetate.

The tables below summarize the polymerization conditions and resulting polymer properties

TABLE 5

Polymerization Conditions and Polymer Properties - Experiment 1

| Sample Number | 2.1.3 | 2.1.6 | 2.1.11 | 2.1.13 | 2.1.14 |
|---|---|---|---|---|---|
| CTA | Triethyl silane | Triethyl silane | Triethyl silane | Triethyl silane | Triethyl silane |
| CTA Flow (Mole/hr) | 0.0360 | 0.0592 | 0.1177 | 0.1065 | 0.1058 |
| CTA solvent flow (mole/hr) | 0.0835 | 0.1373 | 0.2731 | 0.2472 | 0.2456 |
| $I_2$, 2.16 kg @ 190° C. (dg/min) | 0.0 | 0.1 | 16.7 | 14.1 | 9.0 |
| Ethylene feed (g/hr) | 1000 | 1000 | 1000 | 1000 | 1000 |
| Reactor P (bar) | 2000 | 2000 | 2000 | 2000 | 2000 |
| Reactor T (° C.) | 217-235 | 206-220 | 220-241 | 230-248 | 214-246 |
| T (RK2) (° C.) | 227 | 225 | 235 | 237 | 230 |
| Jacket T (° C.) | 188.0 | 186.6 | 187.9 | 187.3 | 186.7 |
| Initiator conc. (mmol/ml) | 0.04773 | 0.04773 | 0.04773 | 0.04773 | 0.04773 |
| Initiator flow (ml/hr) | 0.53108 | 0.53108 | 0.42487 | 0.42487 | 0.42487 |
| Polymer rate (g/hr) | 155.9 | 122.8 | 159.1 | 156.9 | 152.9 |
| Ethylene conversion (%) | 15.6 | 12.3 | 15.9 | 15.7 | 15.3 |
| Run time (hrs) | 0.07 | 0.18 | 0.23 | 0.34 | 0.21 |
| Stirrer (rpm) | 2000 | 2000 | 2000 | 2000 | 2000 |
| Ethylene exit (mol/hr) | 30.09195 | 31.27366 | 29.97802 | 30.05838 | 30.19937 |
| CTA/ethylene | 0.001196 | 0.001892 | 0.003926 | 0.003544 | 0.003505 |
| $\chi_n$ | 1041.9 | 907.2759 | 528.7219 | 540.1989 | 571.5612 |

TABLE 6

Polymerization Conditions and Polymer Properties - Experiment 2

| Sample Number | 2.2.10 | 2.2.11 | 2.2.12 | 2.2.14 | 2.2.17 |
|---|---|---|---|---|---|
| CTA Flow (Mole/hr)) | 0.1166 | 0.1176 | 0.1168 | 0.1249 | 0.1243 |
| $I_2$, 2.16 kg @ 190° C. (dg/min) | 0.7 | 0.7 | 0.6 | 0.6 | 4 |
| Ethylene feed (g/hr) | 1000 | 1000 | 1000 | 1000 | 1000 |
| Reactor P (bar) | 2000 | 2000 | 2000 | 2000 | 2000 |
| Reactor T (° C.) | 208-213 | 209-217 | 207-226 | 204-225 | 223-239 |
| T (RK2) (° C.) | 215 | 217 | 215 | 212 | 235 |
| Jacket T (° C.) | 187 | 187.2 | 187 | 186.8 | 187.1 |
| Initiator conc. (mmol/ml) | 0.01486 | 0.01486 | 0.01486 | 0.01486 | 0.01486 |
| Initiator flow (ml/hr) | 1.2746 | 1.2746 | 1.2746 | 1.2746 | 1.2746 |
| Polymer rate (g/hr) | 113 | 115.1 | 112.7 | 109.9 | 127.8 |
| Ethylene conversion (%) | 11.3 | 11.5 | 11.3 | 11 | 12.8 |
| Run time (hrs) | 0.12 | 0.32 | 0.2 | 0.17 | 0.3 |
| Stirrer/rpm | 2000 | 2000 | 2000 | 2000 | 2000 |
| Ethylene exit (mol/hr) | 31.6216 | 31.5464 | 31.63166 | 31.73285 | 31.09383 |
| CTA/ethylene | 0.003686 | 0.003726 | 0.003692 | 0.003935 | 0.003997 |
| $\chi_n$ | 749.0117 | 747.9793 | 754.2401 | 754.2078 | 626.9781 |

For the tabulated experiments, Cs was derived according to the Mayo equation (Eq. 12) and y, as discussed above with respect to Example 1.

Example 3: Polymerizartion of Vinylacetate

Chemicals: All chemicals were purchased from either Aldrich or Strem. Vinyl acetate was distilled each day prior to use. Azobisisobutyronitrile (AIBN) initiator solutions in toluene were made fresh daily.

Method: Inside a glovebox, samples were prepared by combining in a vial 10 mL vinyl acetate, an appropriate amount of chain transfer agent, and 25 microliters of a 0.25 M AIBN solution in toluene. Each vial was then sealed and placed in a refluxing shaker at 60° C. Each vial was monitored, and the reaction mixture was poured into 20 mL of n-hexane containing 0.02 g of di-tertbutylmethylphenol inhibitor when any obvious increase in viscosity was observed. The resulting polymer was collected by filtration and dried for 1 hour at 130° C. The final polymer was analyzed by GPC to determine molecular weight.

Chain transfer constants where determined by running experiments with different levels of chain transfer agent and measuring the molecular weight of the resulting polymer. The Mayo equation (Eq. 12) was employed.

Cs in ethylene was predicted using following equation:

$$Cs(ethylene) = 10^{0.8158 \, log(Cs(vinyl\ acetate)) + 0.508} \quad (Eq.\ 14)$$

Cs values measured in vinyl acetate and Cs values in ethylene predicted based on Equation 14 are provided in Table 7.

TABLE 7

Measured Cs values in Vinyl Acetate and Predicted Cs values in Ethylene

| CTA | Cs measured (vinyl acetate) | Cs predicted (ethylene) |
|---|---|---|
| HSiMe2OSiMe2H | 0.0168 | 0.115 |
| triethylsilane | 0.022 | 0.143 |
| phenyl dimethyl silane | 0.054 | 0.298 |

TABLE 7-continued

Measured Cs values in Vinyl Acetate and Predicted Cs values in Ethylene

| CTA | Cs measured (vinyl acetate) | Cs predicted (ethylene) |
|---|---|---|
| phenyl methyl silane | 0.18 | 0.795 |
| HSiMe2PhSiMe2H | 0.2531 | 1.050 |
| nBuSiH3 | 0.2617 | 1.079 |
| Me2SiHCl | 0.2784 | 1.135 |
| diiPrNSiH3 | 0.4256 | 1.604 |
| phenyl silane | 0.5 | 1.830 |

Aspects

According to an aspect, either alone or in combination with any other aspect, a method of making an olefin-based polymer by free-radical polymerization in a reactor system includes initiating a free-radical polymerization of an olefin-based monomer, propagating growth of the olefin-based polymer during continued free-radical polymerization of the olefin-based monomer, and adding to the reactor system a chain transfer agent that terminates the growth of the olefin-based polymer. The chain transfer agent includes a silane of formula (1):

(1)

where $R^1$, $R^2$, $R^3$, and $R^4$ are independently selected from a hydrogen atom, a (C1-C40)hydrocarbyl, —N($R^5$)$_2$, —Si($R^5$)$_3$, —OSi($R^5$)$_3$, —O$R^5$, and —$R^6$—Si($R^5$)$_3$; each $R^5$ is independently selected from a hydrogen atom and a (C1-C40) hydrocarbyl; each $R^6$ is (C1-C40)hydrocarbylene; and optionally, any two of $R^1$, $R^2$, $R^3$, and $R^4$, or any two $R^5$ bonded to the same nitrogen atom, or any two $R^5$ bonded to the same silicon atom, are connected to form a ring having from 3 to 50 atoms in the ring, excluding any hydrogen atoms.

According to a second aspect, either alone or in combination with any other aspect, the chain transfer agent does not comprise sulfur or phosphorus.

According to a third aspect, either alone or in combination with any other aspect, the silane of formula (1) is selected from the group consisting of triethylsilane, diethylmethylsilane, tris(trimethylsilyl)silane, n-butylsilane, dimethylphenylsilane, phenylsilane, chlorodimethylsilane, diisopropylaminosilane, 1,2-bis(dimethylsilyl)benzene, 1,3-bis(dimethylsilyl)benzene, 1,4-bis(dimethylsilyl)benzene, and 1,1,3,3-tetramethyldisiloxane.

According to a fourth aspect, either alone or in combination with any other aspect, the silane of formula (1) is selected from the group consisting of trimethylsilane, (trimethylsilyl)dimethylsilane, bis(trimethylsilyl)methylsilane, and tris(trimethylsilyl)silane.

According to a fifth aspect, either alone or in combination with any other aspect, the silane of formula (1) comprises tris(trimethylsilyl)silane.

According to a sixth aspect, either alone or in combination with any other aspect, the reactor system comprises at least one tubular reactor, or at least one autoclave reactor, or a combination of at least one tubular reactor and at least one autoclave reactor.

According to a seventh aspect, either alone or in combination with any other aspect, the reactor system comprises at least one tubular reactor, or at least one autoclave reactor, or a combination of at least one tubular reactor and at least one autoclave reactor and the silane of formula (1) comprises tris(trimethylsilyl)silane.

According to an eighth aspect, either alone or in combination with any other aspect, the reactor system comprises at least one tubular reactor.

According to a ninth aspect, either alone or in combination with any other aspect, the reactor system comprises at least one tubular reactor and the silane of formula (1) comprises tris(trimethylsilyl)silane.

According to a tenth aspect, either alone or in combination with any other aspect, the reactor system comprises a pressure of greater than or equal to 100 MPa during the propagating the growth of the olefin-based polymer.

According to an eleventh aspect, either alone or in combination with any other aspect, the olefin-based monomer comprises ethylene.

According to a twelfth aspect, either alone or in combination with any other aspect, the olefin-based polymer consists of ethylene.

According to a thirteenth aspect, either alone or in combination with any other aspect, the (C1-C40)hydrocarbylene is selected from ethan-1,2-diyl, propan-1,3-diyl, 2-methylpropan-1,3-diyl, phenyl-1,4-diyl, napthalen-2,6-diyl, and napthalen-3,7-diyl.

According to a fourteenth aspect, either alone or in combination with any other aspect, the (C1-C40)hydrocarbylene is phenyl-1,4-diyl.

According to a fifteenth aspect, either alone or in combination with any other aspect, the free-radical polymerization is a high pressure peroxide-initiated free-radical polymerization.

According to a sixteenth aspect, either alone or in combination with any other aspect, the initiating a free-radical polymerization comprises adding a peroxide initiator to the reactor system.

According to a seventeenth aspect, either alone or in combination with any other aspect, the initiating a free-radical polymerization comprises adding a peroxide initiator to the reactor system and the peroxide initiator is chosen from t-butyl peroxy pivalate, di-t-butyl peroxide, t-butyl peroxyacetate, t-butyl peroxyoctoate, and t-butyl peroxy-2-ethylhexanoate, and mixtures thereof.

It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalences.

The invention claimed is:

1. A method of making an olefin-based polymer by free-radical polymerization in a reactor system, the method comprising:
    initiating a free-radical polymerization of an olefin-based monomer in the reactor system;
    propagating growth of the olefin-based polymer during continued free-radical polymerization of the olefin-based monomer; and
    adding to the reactor system a chain transfer agent that terminates the growth of the olefin-based polymer, wherein the chain transfer agent comprises trimethylsilane, (trimethylsilyl)dimethylsilane, bis(trimethylsilyl)methylsilane, or tris(trimethylsilyl)silane.

2. The method of claim 1, wherein the chain transfer agent does not comprise sulfur or phosphorus.

3. The method of claim 1, wherein the chain transfer agent comprises (trimethylsilyl)dimethylsilane, bis(trimethylsilyl)methylsilane, or tris(trimethylsilyl)silane.

4. The method of claim 1, wherein the chain transfer agent comprises tris(trimethylsilyl)silane.

5. The method of claim 1, wherein the reactor system comprises at least one tubular reactor, or at least one autoclave reactor, or a combination of at least one tubular reactor and at least one autoclave reactor.

6. The method of claim 5, wherein the chain transfer agent comprises tris(trimethylsilyl)silane.

7. The method of claim 1, wherein the free-radical polymerization is a high pressure peroxide-initiated free-radical polymerization.

8. The method of claim 1, wherein the initiating a free-radical polymerization comprises adding a peroxide initiator to the reactor system.

9. The method of claim 8, wherein the peroxide initiator is chosen from t-butyl peroxy pivalate, di-t-butyl peroxide, t-butyl peroxyacetate, t-butyl peroxyoctoate, and t-butyl peroxy-2-ethylhexanoate, and mixtures thereof.

10. A method of making an olefin-based polymer by free-radical polymerization in a reactor system, the method comprising:
    initiating a free-radical polymerization of an olefin-based monomer in the reactor system;
    propagating growth of the olefin-based polymer during continued free-radical polymerization of the olefin-based monomer; and
    adding to the reactor system a chain transfer agent that terminates the growth of the olefin-based polymer;
    wherein the reactor system comprises at least one tubular reactor; and wherein the chain transfer agent comprises a silane of formula (1):

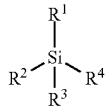

(1)

where
R$^1$, R$^2$, R$^3$, and R$^4$ are independently selected from a hydrogen atom, a (C1-C40)hydrocarbyl, —N(R$^5$)$_2$, —Si(R$^5$)$_3$, —OSi(R$^5$)$_3$, —OR$^5$, and —R$^6$—Si(R$^5$)$_3$;
each R$^5$ is independently selected from a hydrogen atom and a (C1-C40) hydrocarbyl;
each R$^6$ is (C1-C40)hydrocarbylene; and
optionally, any two of R$^1$, R$^2$, R$^3$, and R$^4$, or any two R$^5$ bonded to the same nitrogen atom, or any two R$^5$ bonded to the same silicon atom, are connected to form a ring having from 3 to 50 atoms in the ring, excluding any hydrogen atoms.

11. The method of claim 10, wherein the silane of formula (1) comprises tris(trimethylsilyl)silane.

12. A method of making an olefin-based polymer by free-radical polymerization in a reactor system, the method comprising:
initiating a free-radical polymerization of an olefin-based monomer in the reactor system;
propagating growth of the olefin-based polymer during continued free-radical polymerization of the olefin-based monomer, wherein the reactor system comprises a pressure of greater than or equal to 100 MPa during the propagating the growth of the olefin-based polymer; and
adding to the reactor system a chain transfer agent that terminates the growth of the olefin-based polymer;
wherein the chain transfer agent comprises a silane of formula (1):

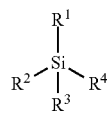

(1)

where
R$^1$, R$^2$, R$^3$, and R$^4$ are independently selected from a hydrogen atom, a (C1-C40)hydrocarbyl, —N(R$^5$)$_2$, —Si(R$^5$)$_3$, —OSi(R$^5$)$_3$, —OR$^5$, and —R$^6$—Si(R$^5$)$_3$;
each R$^5$ is independently selected from a hydrogen atom and a (C1-C40) hydrocarbyl;
each R$^6$ is (C1-C40)hydrocarbylene; and
optionally, any two of R$^1$, R$^2$, R$^3$, and R$^4$, or any two R$^5$ bonded to the same nitrogen atom, or any two R$^5$ bonded to the same silicon atom, are connected to form a ring having from 3 to 50 atoms in the ring, excluding any hydrogen atoms.

\* \* \* \* \*